*(12)* United States Patent
Donovan et al.

(10) Patent No.: US 8,381,624 B2
(45) Date of Patent: Feb. 26, 2013

(54) BAND SAW

(75) Inventors: Robert Donovan, Moorville, MS (US);
Dewayne Stanford, Satillo, MS (US)

(73) Assignee: Chang Type Industrial Co., Ltd.,
Taichung County (TW)

( * ) Notice: Subject to any disclaimer, the term of this patent is extended or adjusted under 35 U.S.C. 154(b) by 872 days.

(21) Appl. No.: 10/774,335

(22) Filed: Feb. 6, 2004

(65) Prior Publication Data

US 2004/0168555 A1    Sep. 2, 2004

Related U.S. Application Data

(60) Provisional application No. 60/445,555, filed on Feb. 6, 2003.

(51) Int. Cl.
*B23D 55/10* (2006.01)
(52) U.S. Cl. ............................................ 83/818; 83/816
(58) Field of Classification Search .................. 83/802, 83/816–819; 474/114; 74/606 R; 403/326–330; 30/385, 386, 513; 198/813, 814
See application file for complete search history.

(56) References Cited

U.S. PATENT DOCUMENTS

| | | | |
|---|---|---|---|
| 170,577 A | 11/1875 | Margedant | 83/817 |
| 769,497 A | 9/1904 | Seymour | 83/422 |
| 1,571,972 A | 2/1926 | Schettler | 83/816 |
| 1,967,724 A | 7/1934 | Ponton | 143/27 |
| 2,081,033 A | 5/1937 | Biro | 143/17 |
| 2,101,343 A | 12/1937 | Ponton | 143/27 |
| 2,364,969 A | 12/1944 | Grob et al. | 29/67 |
| 2,627,881 A | 2/1953 | Houtte et al. | 143/17 |
| 2,825,369 A | 3/1958 | Karp et al. | 143/27 |
| 2,969,815 A | 1/1961 | Lasar | 143/27 |
| 3,465,794 A | 9/1969 | McLauchlan et al. | 143/17 |
| 3,521,682 A | 7/1970 | Schnizler, Jr. | 143/21 |
| 3,658,102 A | 4/1972 | Joosten | 143/27 R |
| 3,829,970 A | 8/1974 | Anderson | 30/380 |
| 3,889,567 A | 6/1975 | Sato et al. | 83/818 |
| 4,311,074 A | 1/1982 | Titus | 83/816 |
| 4,321,849 A | 3/1982 | Athey et al. | 83/816 |
| 4,329,901 A | 5/1982 | Stroud | 83/819 |
| 4,356,750 A * | 11/1982 | Legler et al. | 83/816 |

(Continued)

FOREIGN PATENT DOCUMENTS

CH        205262       9/1939
DE         22296      10/1958

(Continued)

OTHER PUBLICATIONS

"Quick Release by Carter," Installation Instructions; 9 pages.

(Continued)

*Primary Examiner* — Stephen Choi
(74) *Attorney, Agent, or Firm* — Dority & Manning, P.A.

(57) ABSTRACT

A tensioning mechanism for a band saw includes a tension spring assembly coupled with a sliding tension bracket which is adjustably coupled with an upper arm of the band saw. The sliding tension bracket engages an upper band wheel which couples with a band saw blade. A cam assembly is coupled with the tension spring assembly, the cam assembly imparts a rotational force which is translated into a linear tensioning force by the tension spring assembly upon the band saw blade. A cover assembly is selectively engaged with the cam assembly through use of a biasing assembly. The cover assembly includes an index indicator for identifying an index position and includes a handle which enables a user to selectively engage and rotate the cover assembly. The rotation of the handle in turn rotates the cam assembly applying the rotational force which is translated into the tensioning force.

39 Claims, 23 Drawing Sheets

U.S. PATENT DOCUMENTS

| | | | | |
|---|---|---|---|---|
| 4,386,545 | A | 6/1983 | Chaconas | 83/817 |
| 4,505,176 | A | 3/1985 | Hamel | 83/808 |
| 4,535,666 | A | 8/1985 | Fiori et al. | 83/795 |
| 4,576,077 | A | 3/1986 | Titus | 83/816 |
| 4,640,171 | A | 2/1987 | Jansson | 83/797 |
| 4,920,650 | A | 5/1990 | Edlund | 30/386 |
| 4,926,733 | A | 5/1990 | Janson | 83/819 |
| 4,960,026 | A | 10/1990 | Terpstra | 83/818 |
| 5,070,618 | A | 12/1991 | Edlund | 30/386 |
| 5,109,744 | A | 5/1992 | Syre et al. | 83/818 |
| 5,176,055 | A | 1/1993 | Wijesinghe et al. | 83/72 |
| D336,653 | S | 6/1993 | Baird et al. | D15/134 |
| 5,237,897 | A | 8/1993 | Wijesinghe et al. | 83/72 |
| 5,261,304 | A * | 11/1993 | Stollenwerk et al. | 83/410.8 |
| 5,305,673 | A | 4/1994 | Costley | 83/802 |
| 5,345,850 | A | 9/1994 | Neitzell | 83/814 |
| 5,408,910 | A | 4/1995 | Ohnishi et al. | 83/820 |
| 5,557,989 | A | 9/1996 | Smith, Jr. | 76/74 |
| 5,662,017 | A | 9/1997 | Mellon | 83/169 |
| 5,819,630 | A | 10/1998 | Smith | 83/811 |
| 5,941,153 | A | 8/1999 | Chang | 83/662 |
| 6,073,531 | A | 6/2000 | Chang | 83/818 |
| H1867 | H | 10/2000 | Quiram | 83/781 |
| 6,557,447 | B2 | 5/2003 | Lee | 83/816 |
| 6,739,231 | B2 * | 5/2004 | Snodgrass, Jr. | 83/816 |
| 2001/0054337 | A1 | 12/2001 | Snodgrass, Jr. | 83/13 |
| 2003/0196535 | A1 | 10/2003 | Chiang | 83/818 |
| 2004/0025660 | A1 | 2/2004 | Behne | 83/788 |

FOREIGN PATENT DOCUMENTS

| | | |
|---|---|---|
| DE | 2625096 | 6/1976 |
| DE | 4104576 | 2/1991 |
| GB | 160007 | 3/1921 |

OTHER PUBLICATIONS

"Quick Release Band Saw Blade Tension Toggle," Quick Release Main Page, http://www.carterproducts.com/product/quickrel/qrl.htm; Dec. 31, 2002; 2 pages.

"Faster Bandsaw Blade Changes," by Danny Proulx; CabinetMaker®, p. 152; Jun. 2001; 1 page.

"Taunton's Fine Woodworking, Tools & Materials, Release and Reset Bandsaw-Blade Tension in Seconds," by John White; Aug. 2001; No. 150; 1 page.

"Carter Quick Release™, Bandsaw Blade Tension Toggle," Carter Products Company, Inc., 2871 Northridge Drive N. W., Grand Rapids, MI 49544; sales@4carterproducts.com.: 1 page.

* cited by examiner

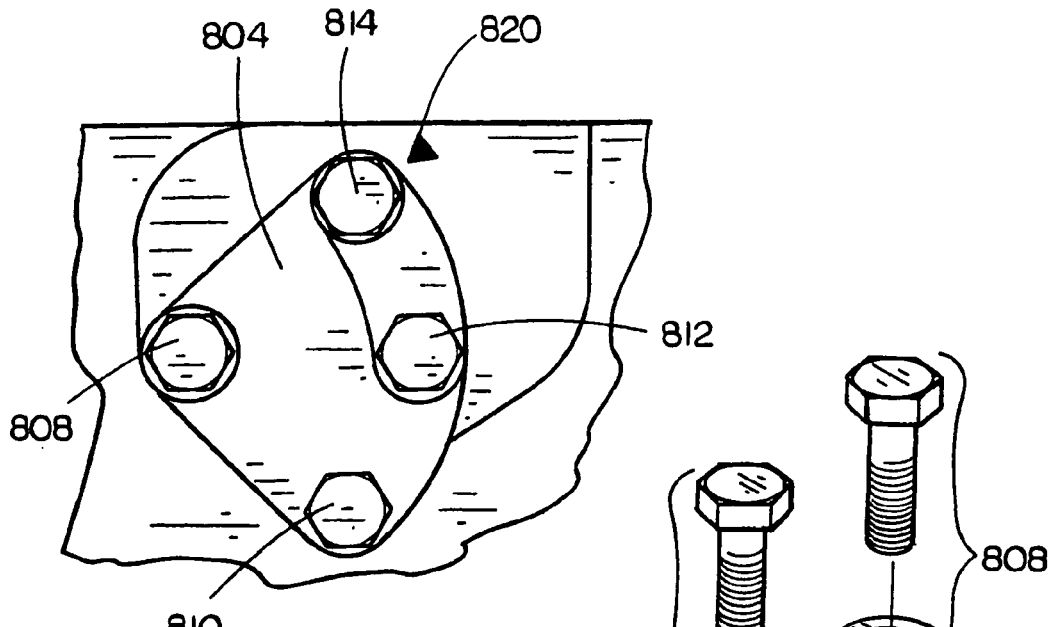
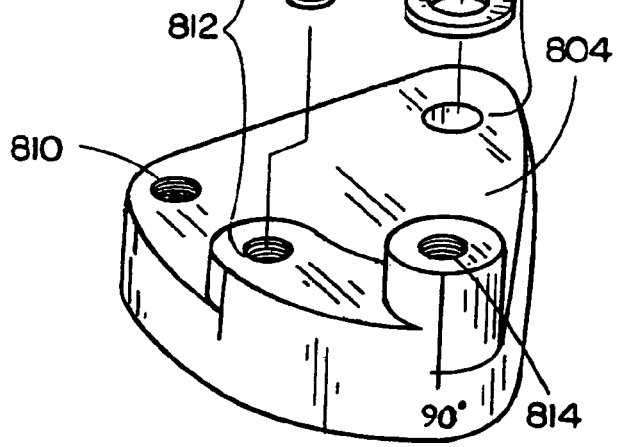
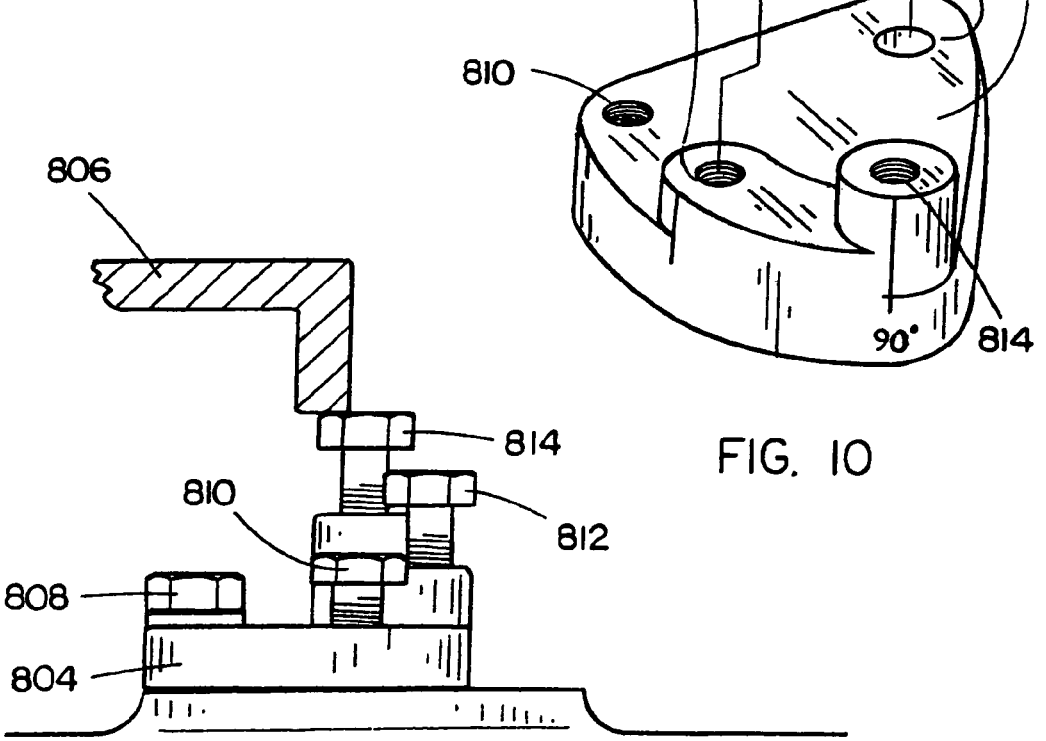
FIG. 8B
FIG. 10
FIG. 9

BAND SAW

CROSS REFERENCE TO RELATED APPLICATION

The present application claims priority under 35 U.S.C. §119(e) to the U.S. Provisional Application Serial No. 60/445,555, filed on Feb. 6, 2003, which is herein incorporated by reference in its entirety.

FIELD OF THE INVENTION

The present invention generally relates to the field of cutting devices, and particularly to a continuous loop cutting apparatus.

BACKGROUND OF THE INVENTION

Band saws employ a continuous loop blade that is coupled to a pair of pulleys or band wheels. The band wheels are typically mounted in a common plane to a frame, the mounting spaces apart the band wheels and allows the band wheels to rotate about parallel axes. Typically, one of the band wheels is coupled with a motor assembly which drives the rotation of the band wheel and therefore the blade.

Generally, one of the band wheels is enabled to be moved relative to the position of the other band wheel while maintaining the common plane and parallel axes of rotation. This movement capability allows an operator of a band saw to increase and decrease the distance between the upper and lower band wheels, thereby increasing or decreasing the tension applied to the band saw blade. This is commonly referred to as tensioning the band saw blade.

Proper care of a band saw includes releasing the tension on the continuous loop blade, when not in use, to prevent stretching the blade, deforming the frame and the like. This detensioning process can be time consuming for the user. Another difficulty in using a band saw is when changing blades. For example, band saws may accept a variety of blades to accomplish different tasks such as re-sawing, curve cutting and the like. Various operations require different blades. For instance, a three-quarter inch (¾") blade may be used for re-sawing, while a three-eighths inch (⅜") blade is used for cutting a tight radius. Previously, a user would have to rotate a threaded shaft device to adjust one of the band saw pulley wheels to achieve the proper tension. When switching between different sized blades the user is often forced to repeat this process. Because of the time required to properly tension a blade to account for different sized blades, the user may be tempted to employ a single size blade to accomplish different tasks. For instance, a user may try to use a wide blade to cut a curve rather than switching to the proper width, to save time. Using the wrong blade may result in an imprecise cut, a wrong cut, damage the equipment, and the like.

Dust and debris collection is another problem in workshops, and particularly, in woodworking shops. For example, in a small woodshop if sawdust is not properly collected, dust may impede staining and varnishing operations. Additionally, many hardwoods are hazardous to people with allergies or respiratory problems associated with repeated exposure to dust. Proper dust collection at the source, such as at a band saw, may eliminate much of the dust created during cutting. Current band saws suffer from poor dust collection performance, such as clogging or dust collection hoses interfering with operations by exiting the band saw adjacent to the work area. Clogging may occur at the throat plate, where the loop blade passes below the table, or near the bottom of the saw blade path.

Proper angle adjustment is difficult for many power tools, such as band saws, drill presses, and the like, employing variable angle support surfaces. For example, a user may wish to angle a band saw table to provide a beveled cut. To accomplish this beveled cut, the user releases a securing assembly, rotates the support surface to the proper angle using a gage, and perhaps checks the angle with a square, before re-securing the support. Current tools with adjustable tables are susceptible to improper alignment and/or variation in alignment, especially when friction securing assemblys, such as a clamp mechanism, are used. For example, a support surface may become misaligned due to accidental contact or other factors. In another example, even though exercising caution, a user may accidentally vary the angle between the support surface and the tool, resulting in misalignment. While utilizing a gauge or conducting a sample cut reduces error, these techniques are time consuming.

Therefore, it would be desirable to provide a device for overcoming the previously experienced drawbacks.

SUMMARY OF THE INVENTION

Accordingly, the present invention is directed to a tensioning mechanism in a first aspect. The tensioning mechanism includes a tension spring assembly for applying a tensioning force. The tension spring assembly is coupled with a cam assembly which is selectively engaged by a cover assembly. The cover assembly includes a handle which may be engaged by a user to impart a force which is translated through the cam assembly into the tension spring assembly. An index indicator is coupled with the cover assembly and enables visual identification of index positions for the cover assembly. The present invention enables the quick selection of a tensioning force by a user through visual identification of index positions.

In a second aspect the tensioning mechanism is for a band saw and comprises a tension spring assembly coupled with a sliding tension bracket adjustably coupled with an upper arm of the band saw. The tension spring assembly provides a tensioning force which is translated through the sliding tension bracket to an upper band wheel which further translates the tensioning force to a band saw blade to which the upper band wheel is coupled. A cam assembly is coupled with the tension spring assembly; the cam assembly imparts a rotational force to the tension spring assembly which translates the rotational force into the tensioning force upon the band saw blade. A cover assembly is selectively engaged with the cam assembly. The cover assembly includes an index indicator for identifying an index position of the cover assembly relative to the cam assembly. The cover assembly includes a handle which enables a user to rotate the cover assembly which in turn rotates the cam assembly supplying the rotational force which is translated into the tensioning force.

In a third aspect of the present invention, a method for adjusting the tension of a band saw blade is provided. The band saw blade being operationally coupled with an upper band wheel of a band saw, positioning a tension mechanism comprising a tension spring assembly operationally engaged with the upper band wheel, a cam assembly coupled with the tension spring assembly, a cover assembly which may be selectively engaged with the cam assembly by a user, and an index indicator enabling the user to quickly determine an index position of the cover assembly based on the size of the band saw blade, followed by at least one step selected from the group consisting of: (a) positioning the cover assembly relative to the cam assembly, in the index position indicated by the index indicator, and rotating a handle of the cover assembly to a second tensioning position from a first tensioning position whereby the tension spring assembly moves the upper band wheel in a first direction increasing tension on the band saw blade; or (b) rotating the handle to a first tensioning position from the second tensioning position whereby the tension spring assembly moves the upper band wheel in a second direction decreasing tension on the band saw blade.

It is to be understood that both the forgoing general description and the following detailed description are exemplary and explanatory only and are not restrictive of the invention as claimed. The accompanying drawings, which are incorporated in and constitute a part of the specification, illustrate exemplary embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 8B is a top view of a positive angle stop of the positive angle stop assembly of FIG. 8A;

FIG. 9 is an enlarged side view of the positive angle stop with adjustable individual stops which are for engaging the variable angle table;

FIG. 10 is an exploded view of the positive angle stop comprising a turret including adjustable individual stops;

DETAILED DESCRIPTION OF THE INVENTION

Reference will now be made in detail to the presently preferred embodiments of the invention, examples of which are illustrated in the accompanying drawings.

Referring generally now to FIGS. 1A through 6B, exemplary embodiments of the present invention are shown. A tensioning mechanism, of the present invention, provides an amount of tension which, in exemplary embodiments, may be applied to a saw blade of a band saw. The amount of tension may be varied to accommodate the use of differently sized band saw blades. The tensioning mechanism when employed with a band saw is often used in conjunction with a standard tensioning device, such as a threaded shaft or rack-and-pinion device. The tensioning mechanism provides a user with an adjustment capability to complement the adjustments made using the standard tensioning device. This may prolong the useful life of the saw blade and prevent damage to the other components of the band saw.

Figure 1A:
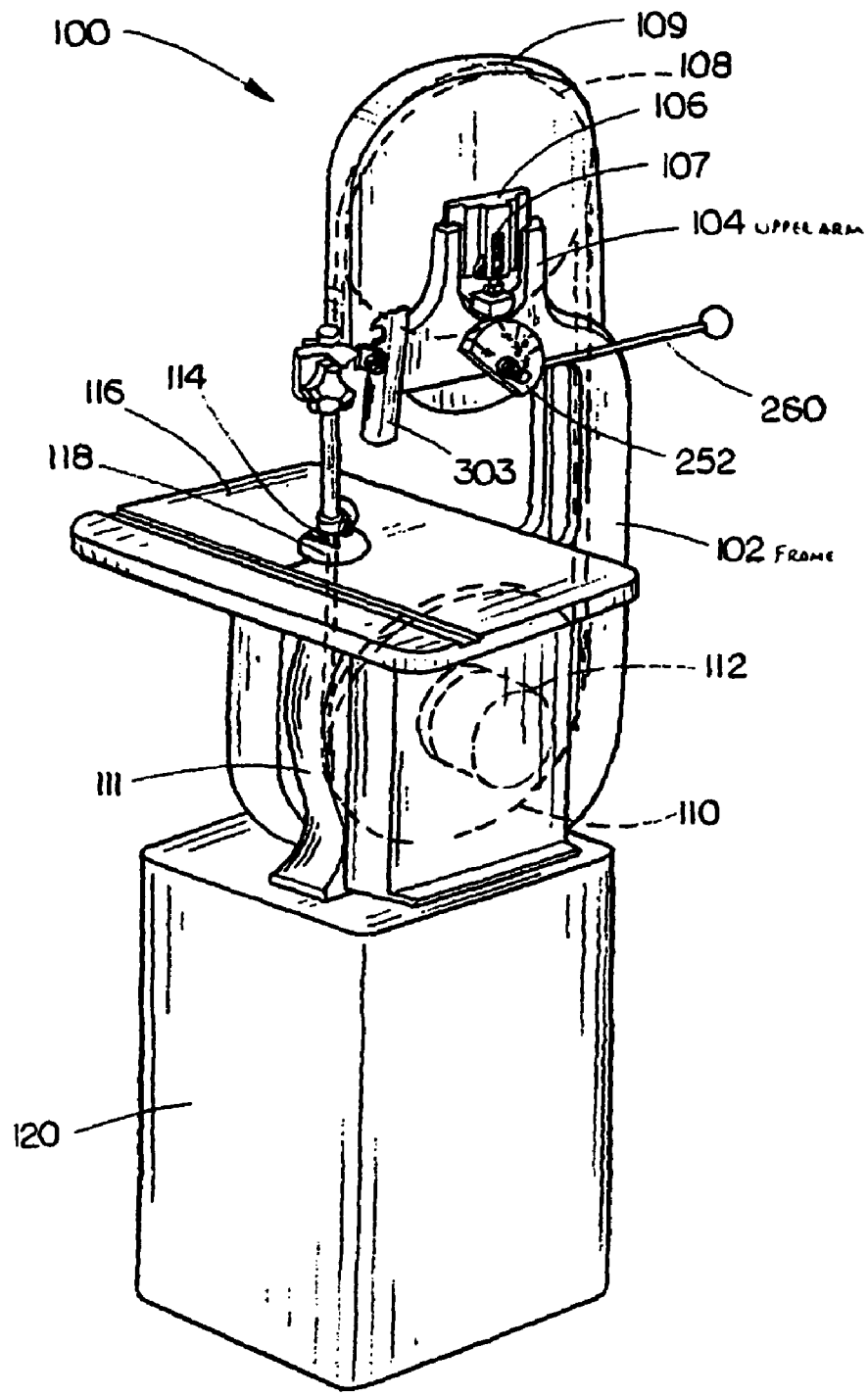
FIG. 1A is a perspective view of a band saw including a tensioning mechanism of the present invention.

A band saw 100, shown in FIG. 1A, generally comprises a frame 102 including an upper arm 104 adjustably coupled with a sliding tension bracket 106. The sliding tension bracket 106 defines a recessed area 107 and is further coupled with an upper band wheel 108. The upper band wheel 108, in the current embodiment, is at least partially surrounded by an upper housing 109 which couples with the frame 102. It is contemplated that the upper housing 109 may couple with the upper arm 104. The coupling of the upper band wheel 108 with the sliding tension bracket 106 enables rotational capabilities in the upper band wheel 108 and enables a vertical adjustment capability in the position of the upper band wheel 108, in coordinated operation with a tensioning mechanism 200, shown in FIG. 1B and described below. The frame 102 further couples with a lower band wheel 110. The lower band wheel 110 being at least partially encompassed by a lower housing 111 in the current embodiment. The lower band wheel 110 is imparted with angular momentum through an operational coupling with a motor 112. Thus the lower band wheel 110, imparted with a rate of rotation by the motor 112, is often referred to as the drive wheel.

The upper and lower band wheels are established in a common vertical plane but in a spaced-apart configuration. The upper and lower band wheels are engaged by a continuous loop saw blade 114. The mounting of the upper and lower band wheel enables them to rotate about parallel axes and impart angular momentum to the saw blade 114. A table 116 is coupled with the frame 102 and is operationally engaged by the saw blade 114. The saw blade 114 operationally engages through the table 116 via a throat plate 118. It is understood that the table 116 is mounted between the upper and lower band wheels.

In the current embodiment, the band saw 100 further includes a base 120. The base 120 may be of various dimensions and configurations as contemplated by those of ordinary skill in the art. The base 120 may be enabled to house within the motor 112 and allow for operational engagement between the motor 112 and the lower band wheel 110. It is contemplated that the base 120 may be of particular dimensions to accommodate various additional apparatus and systems which may be employed in conjunction with the band saw 100. For instance, a dust collection system may be coupled with the band saw 100 and enabled in its functionality, at least partially, through the base 120, as will be shown and described below. It is understood that other configurations and functional capabilities may be employed for and with the band saw 100 as contemplated by one of ordinary skill in the art.

Figure 1B:
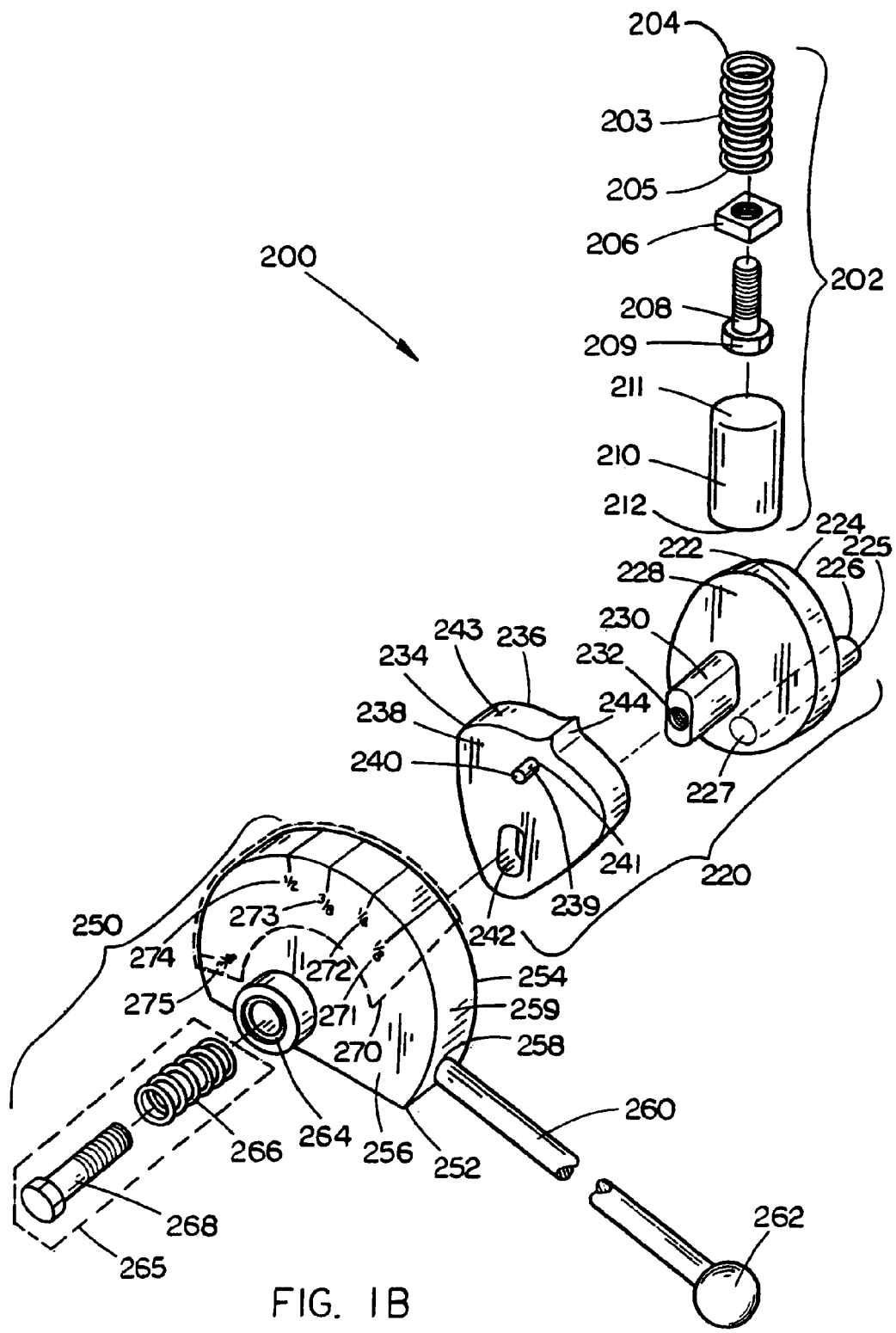
FIG. 1B is an exploded view of tension spring assembly, a cam assembly, and a cover assembly of the tensioning mechanism of FIG. 1A.

The tensioning mechanism 200 is shown in FIG. 1B. In general, the tensioning mechanism may assist in overcoming the difficulty associated with changing loop blades, such as saw blade 114 on band saw 100. It may be the case that a user of a band saw may encounter a situation where they need to switch saw blades. These saw blades may be of different widths which affects required performance parameters, such as tension. When switching between blades of different widths, the user is often required to vary the tension to accommodate the blade. The ability to vary the tension to accommodate different blades helps to ensure the maintenance of a uniform tension on the different blades and may assist in minimizing potential accidents, reduce stress on the blade and saw frame, promote uniform/accurate cuts, and the like. For example, when switching between a three-eighths inch (⅜") to a three-quarters (¾") inch blade the tension may be required to be adjusted to minimize the play in the blade. For instance, maintaining the tension on the saw blade at an optimal, approximate, 15,000 pounds per square inch (PSI) may require the user to increase or decrease the distance the loop blade travels or is extended about the upper and lower band wheels. Those of skill in the art will appreciate that the optimal pressure rating may vary depending on the blade/saw system and it is the intention of this disclosure to encompass and include such variation. The tensioning mechanism 200, of the present invention, enables such tension adjustment and may assist in helping the user to avoid over tensioning. As will be described below, the tensioning mechanism 200 of the present invention includes an advantageous indexing capability which may promote quicker and more accurate tension adjustments.

In the preferred embodiment, the tensioning mechanism 200 includes a tension spring assembly 202, a cam assembly 220, a cover assembly 250, and an index indicator 270. In general, the tension spring assembly 202, cam assembly 220, cover assembly 250, and index indicator 270 operationally couple together and engage with the sliding tension bracket 106 via the upper arm 104.

The tension spring assembly 202 includes a tension spring 203 which provides a tensioning force for the band saw 100. Preferably, the tension spring 203 is a compression spring. It is understood that specific dimensions of the tension spring 203, such as the size, configuration, thickness, and the like, may vary to accommodate the needs of a particular power tool with which the present invention may be employed. The tension spring 203 has a main axis and is defined by a first end 204 and a second end 205. A fine adjustment assembly, including a nut 206 and a variable length member 208 having a mechanical connection 209, is disposed in proximal relation to the second end 205 of the tension spring 203. The nut 206 is capable of accepting the variable length member 208. In the current embodiment, the variable length member 208 includes a threaded section and is disposed with the mechanical connection 209. The mechanical connection 209 being a hex head, so that the mechanical connection 209 of the variable length member 208 is accessible to a hand tool, i.e., an open end box wrench or the like. A plunger 210 includes a first end 211 which engages with the variable length member 208. The plunger 210 includes a second end 212 which provides the coupling of the tension spring assembly 202 with the cam assembly 220 and may promote lubricant around the coupling point.

The fine adjustment assembly may promote fine adjustments of the tensioning force provided by the tension spring 203. This may be accomplished through engagement with the mechanical connection 209. In the current embodiment, the mechanical connection 209 is a hex head disposed on the end of the variable length member 208 which engages with the plunger 210. The user of the present invention may engage a wrench against the hex head and through rotation of the hex head cause the variable length member 208 to rotate. The rotation of the variable length member 208 causes the nut 206 to be displaced along the length of the threaded section of the member 208. Therefore, depending on the direction of rotation of the hex head the nut 206 may be moved up the threaded section away from the hex head or down the threaded section towards the hex head. When the nut 206 is moved up the threaded section, the tensioning of the tension spring 203 is increased thereby increasing the tensioning force provided by the tension spring 203. When the nut 206 is moved down the threaded section, the tensioning of the tension spring 203 is decreased thereby decreasing the tensioning force provided by the tension spring 203. It is understood that alternate fine adjustment systems may be employed without departing from the scope and spirit of the present invention. For example, a ratchet system or latch system may be employed to enable the fine adjustment of the tension spring 203.

A further alternative enablement of a fine adjustment assembly may include extending the variable length member 208. The extended variable length member 208 may extend above the upper housing 109 of the band saw 100. It is understood that the extension length may be varied to accommodate different user and/or manufacturer needs. With the variable length member 208 extended above the upper housing 109, a handknob may be coupled to the end which extends above the upper housing. The handknob may provide the exact same functionality as the hex head screw described previously. The user may rotate the handknob, clockwise or counterclockwise, to enable the movement of the nut 206 as described above. This may be advantageous in that the user may engage the handknob with a hand and not have to employ a tool to make a fine adjustment to the tensioning mechanism 200.

It is contemplated that an indicator may be included within the tension spring assembly to identify to the user the relative tensioning force being applied. For example, a washer may be coupled between the nut 206 and the second end 205 of the tension spring 203. The washer may provide a visual indication to the user of the positioning of the tension spring and thereby indicate to the user the tensioning force being applied. It is further contemplated that the indicator may be of various colors which may increase the ease with which the user is able to identify the indicator. Further, the configuration of the indicator may be varied as contemplated by those of ordinary skill in the relevant art.

The cam assembly 220 is generally positioned adjacent to the tension spring assembly 202 to provide a rotational force which the tension spring assembly 202 translates into the tensioning force. The cam assembly 220 generally comprises a cam 222, a pin 225, a cam actuation member 230, and a cam actuator 234. The cam 222 includes a first side 224 and a second side 228. The cam 222 is generally somewhat oval in shape but it is contemplated that the cam 222 may be of various design configurations to accommodate the needs of the various power tools with which the present invention may be employed. The pin 225 is a cylindrically shaped element including a first end 226 and a second end 227. The length and shape of the pin 225 may vary as contemplated. The second end 227 of the pin 225 connects with the first side 224 of the cam 222. In the preferred embodiment, the pin 225 connects with the cam 222 proximal to a bottom edge of the cam 222. The location of the connection of the pin 225 with the cam 222 may be changed without departing from the scope and spirit of the present invention.

In the current embodiment of the tensioning mechanism 200, the coupling of the spring tension assembly 202 with the cam assembly 220 is through the seating of the plunger 210 upon the cam 222. In operation the second end 212 of the plunger 210 is operationally coupled/seated/engaged against the cam 222. In an alternative embodiment, the plunger 210 may be seated upon the pin 225. In operation the second end 212 of the plunger 210 is coupled/seated/engaged against the pin 225, proximal to the first end 226 of the pin 225. It is further contemplated that the plunger 210 may engage against various surfaces established for providing the operational functionality described above and disposed upon the cam 222. For example, an integrated protrusion extending away from the cam 222 may provide the engagement surface for the plunger 210.

The second side 228 of the cam 222 is connected with the cam actuation member 230. On the end opposite the connection of the cam actuation member 230 with the cam 222, the cam actuation member 230 includes a receiver 232. The receiver 232, in the current embodiment is a threaded receiver which provides a coupling point for a biasing assembly 265 of the cover assembly 250, discussed below.

A cam actuator 234 is positioned adjacent to the cam 222 generally along the axis of rotation of the cam 222. The cam actuator 234 is coupled to the cam 222 via insertion of the cam actuation member 230 into and through a cam actuator receiver 242. In the current embodiment, the cam actuation member 230 is a rectangular extension directed towards the cam actuator 234 which inserts through the cam actuator receiver 242 which is a generally rectangular aperture extending from the first side 236 to the second side 238 of the cam actuator 234. It is understood that the mechanical coupling of the cam actuator 234 with the cam 222 may vary as contemplated by those of ordinary skill in the relevant art.

The cam actuator 234 further includes a cam actuation pin 239 and a cam actuation rib member 244. The cam actuation pin 239 is a generally cylindrically shaped pin having a first end 240 and a second end 241. The second end 241 is connected to the cam actuator 234 proximal to a top edge 243. The first end 240 engages with the cover assembly 250 as will be described below. Disposed upon the top edge 243 and proximal to the cam actuation pin 239 is the cam actuation rib member 244. The rib member 244 is used as an indicator during alignment of the cover assembly 250 with the cam assembly 220. The rib member 244, in effect, points to the index indicator and provides assistance in identifying the tensioning force being applied, discussed below.

The cover assembly 250 includes a cover 252 having a first side 254 and a second side 256. The first side 254 is disposed with a series of recesses 253, 255, and 257 (shown in FIG. 2), which may be engaged by the cam actuation pin 239 of the cam actuator 234. The recesses 253, 255, and 257 enable the cover assembly 250 to be established in a plurality of index positions. It is understood that the recesses 253 through 257 are exemplary and the number, location, and configuration, of the recesses may vary without departing from the scope and spirit of the present invention. The cover 250 is generally half-moon shaped and is disposed with an index indicator 270 on the second side 256. The index indicator 270 includes a series of markers (preferably visual markers) upon the second side 256 of the cover 252. In the current embodiment, a first marker 271 comprises a first line terminating with a ⅛ underneath the line, a second marker 272 comprises a second line terminating with a ¼ underneath the line, a third marker 273 comprises a third line terminating with a ⅜ underneath the line, a fourth marker 274 comprises a fourth line terminating with a ½ underneath the line, and a fifth marker 275 comprises a fifth line terminating with a ¾ underneath the line. In FIG. 1B, it is shown that the lines extend over a top edge 259 of the cover 252. The extension of the lines upon the top edge 259 may enable the functionality of the cam actuation rib member 244.

Figure 2:
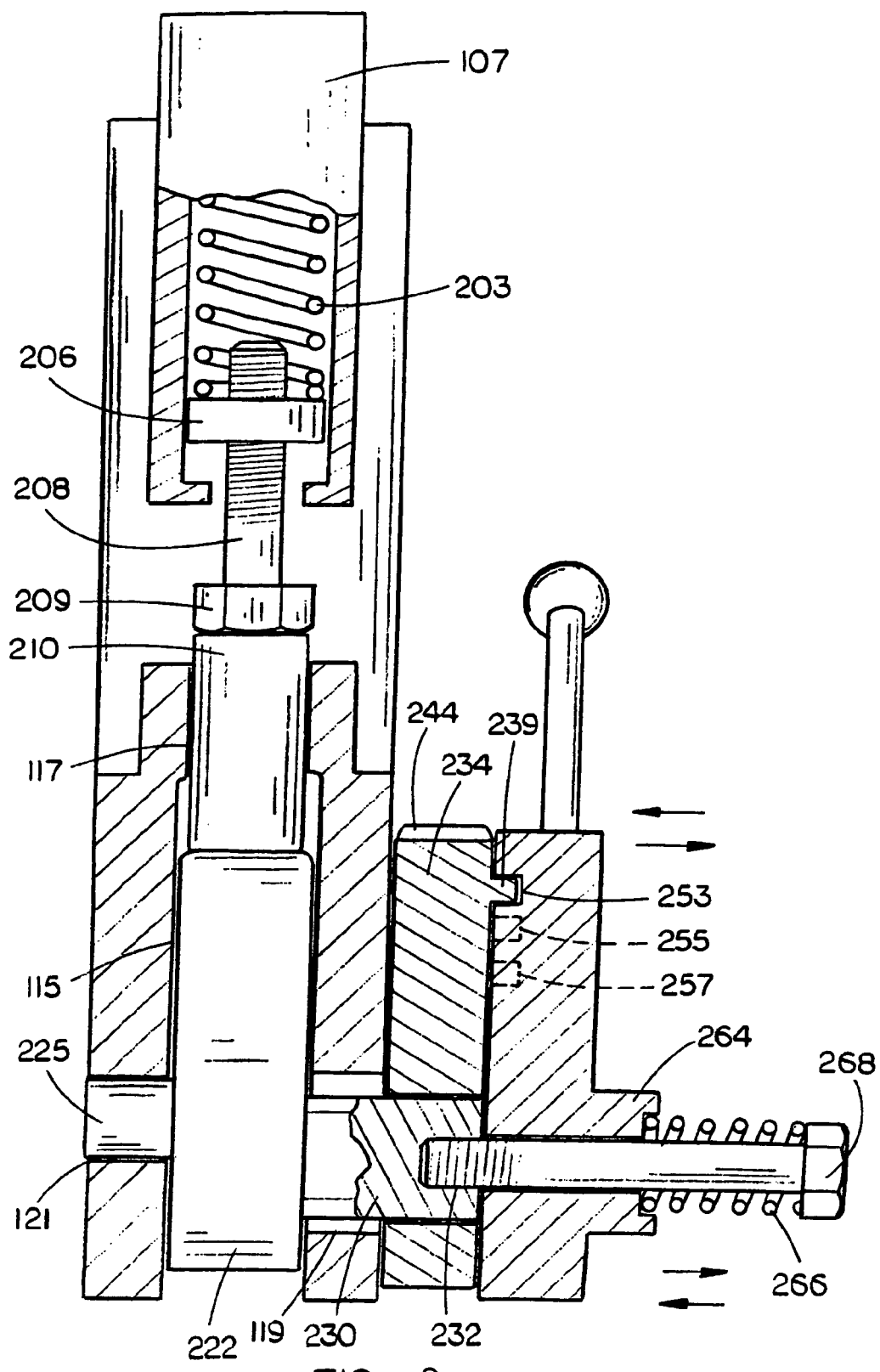
FIG. 2 is a cut-away view of the tensioning mechanism of FIG. 1A including the tension spring assembly coupled with the cam assembly coupled with the cover assembly.
Figure 3A:
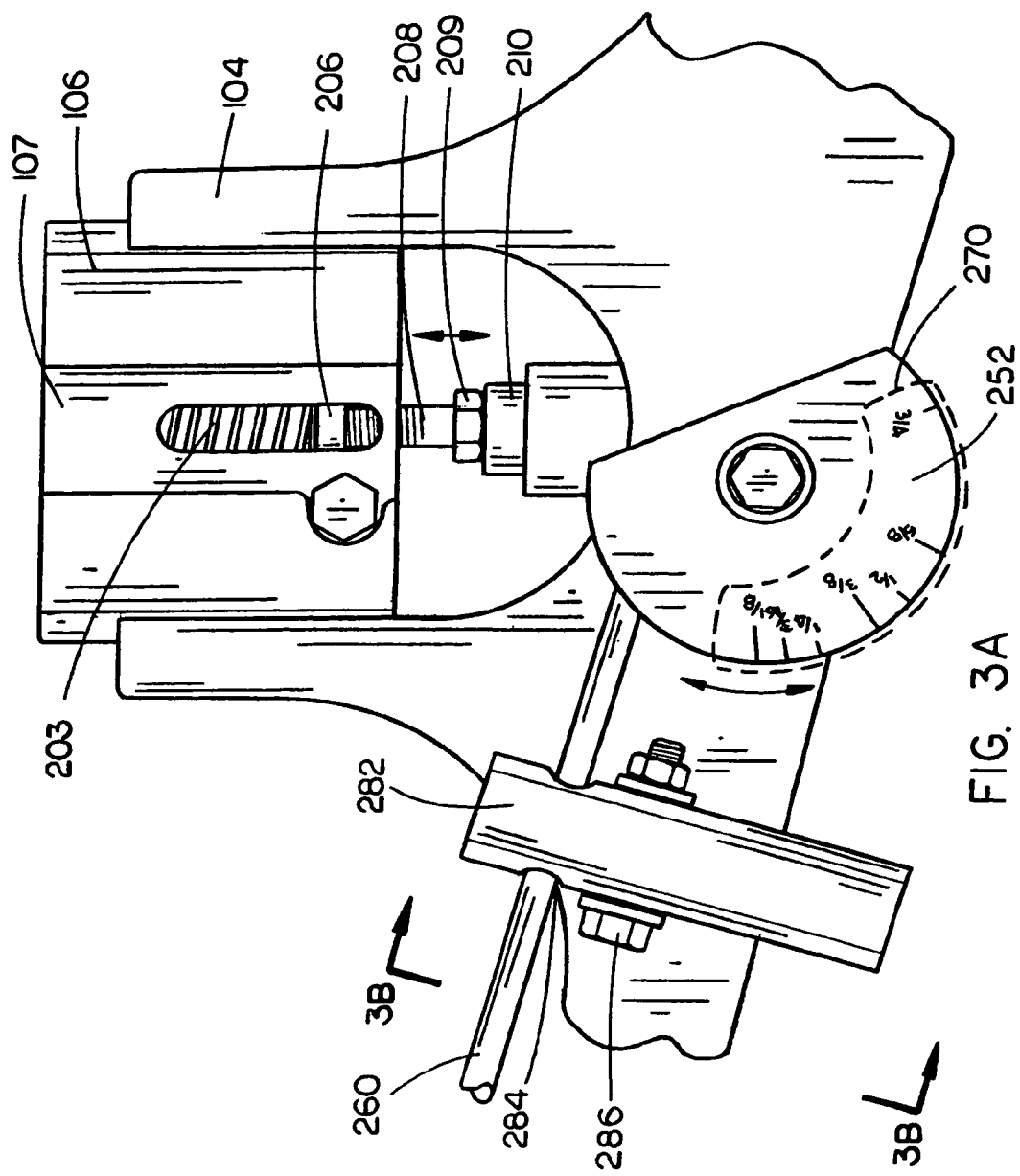
FIG. 3A is a side view of the tensioning system illustrating linear movement of a plunger coupled with a variable length member enabled through the rotation of the cover assembly.
Figure 3B:
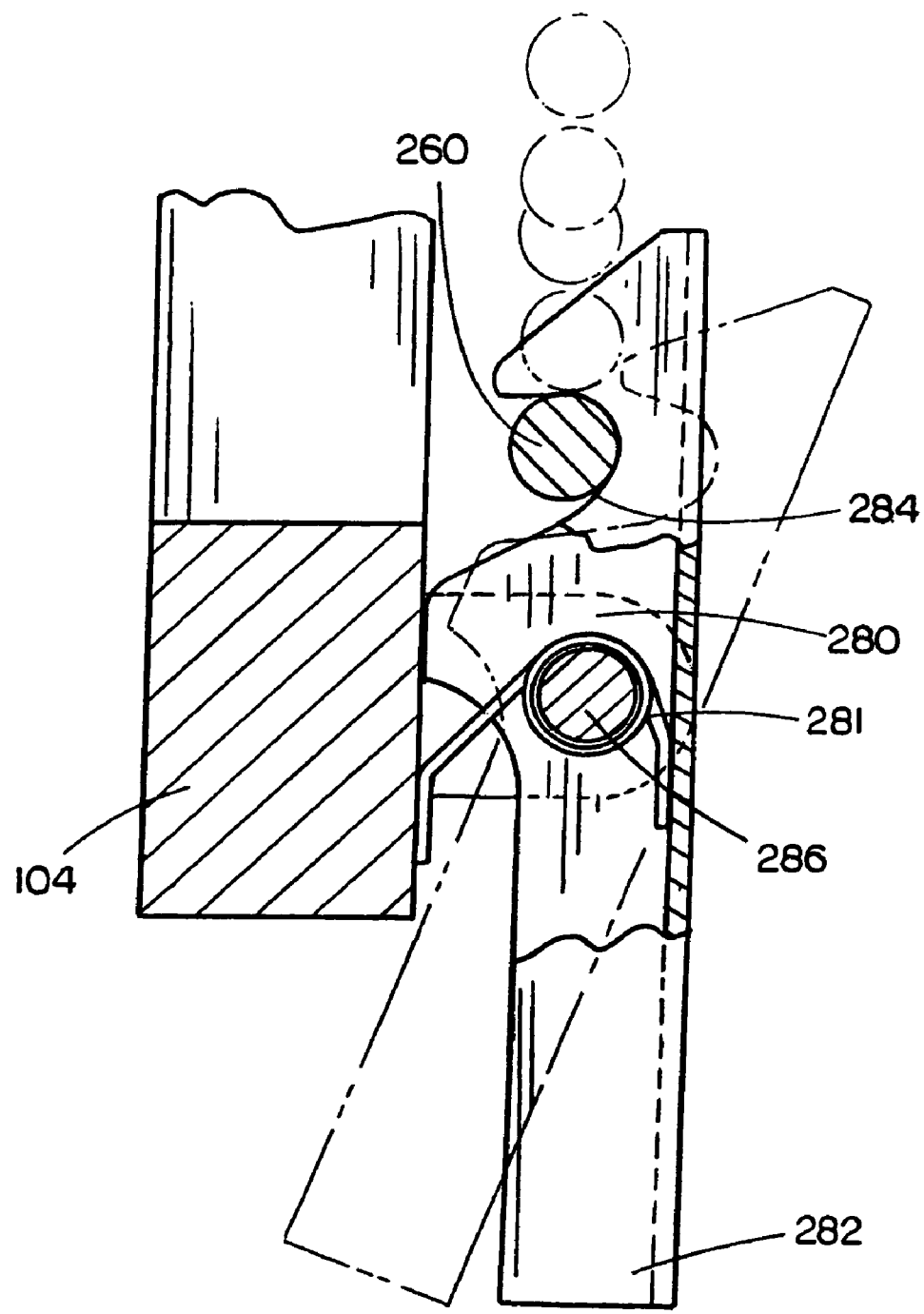
FIG. 3B is a front view illustrating the securing of a handle by the securing assembly.

It is understood, that in this exemplary embodiment, each marker 271 through 275 may correspond with the position of a recess, similar to the series of recesses 253 through 257 shown in FIG. 2, located on the second side 254 of the cover 252. Therefore, each marker, in combination with its corresponding recess, establishes an index position into which the cover assembly 250 may be selectively engaged. This ability to selectively engage the cover assembly 250 into various index positions is described below.

The establishment of the cover assembly 250 into various index positions is enabled by a handle 260, which may be adjusted from a first biasing position into a second biasing position. The direction of movement between the first and second biasing positions is indicated in FIG. 2 by the two sets of arrows. The handle 260 couples with a handle receiving point 258 disposed upon the cover 252. The biasing assembly 265 includes a biasing spring 266 coupled with a biasing element 268 which couples with a biasing element receiver 264 disposed upon the cover 252. In the present embodiment, the biasing element 268 is a bolt including a threaded section. In the preferred embodiment, the handle 260 includes a ball knob 262 coupled to the end opposite the handle's 260 coupling with the cover 252. The handle may be of various configurations as contemplated. The handle 260 assists in enabling the rotational movement capabilities and selective engagement capabilities of the cover 252.

The biasing assembly 265 further assists in enabling the rotational movement and selective engagement capabilities of the cover 252. The biasing element receiver 264 is an aperture that extends from the second side 256 through to the first side 254 of the cover 250. The location of the biasing element receiver 264 enables the biasing element 268 to extend through the cover 252 and engage the threaded section of the biasing element 268 into the receiver 232 of the cam actuation member 230. The engagement of the biasing element 268 with the cam actuation member 230 connects the cover assembly 250 with the cam assembly 220.

In order to set the cover assembly 252 into a desired index position the user may engage with the handle 260. The user may pull (bias) the handle 260 out from the first biasing position into the second biasing position. The handle 260 in the second biasing position establishes the cover 252 away from the cam actuator 234, thereby disengaging the cam actuation pin 239 from its seat within one of the recesses disposed in the first side 254 of the cover 252. In the present embodiment, the recesses on the first side 254 of the cover 250, corresponding to the markers 271 through 275 (exemplified by the FIG. 2), are positioned in accordance with the approximate linear distance required to achieve proper tensioning for the blade width identified by the markers 271 through 275. With the handle 260 in the second biasing position and cover 252 biased into the disengaged position, the user may then rotate the handle 260, which has the effect of rotating the cover 252 relative to the cam actuator 234 and the cam actuation pin 239, until the user has reached the desired index position. The user may identify that the desired index position has been reached through visual ascertainment of the alignment of the cam actuation rib member 244 with the line, extending across the top edge 259 of the cover 252, of the marker corresponding with the number (e.g., ⅛, ¼, ⅜, ½, and ¾) which identifies the width of the saw blade being used. It is contemplated that alternative indexing position alignment systems may be employed.

Once the user has made the visual alignment of the cam actuation rib member 244 with the desired marker 271 through 275, the user may release the handle 260 which places the handle 260 into the first biasing position which corresponds with a first tensioning position for the handle 260. When the handle 260 is established into the first tensioning position, the biasing force provided by the biasing spring 266 causes the cover 252 to be engaged against the cam actuator 234. This has the effect of engaging the cam actuation pin 239 within the recess defined on the first side 254 of the cover 252, corresponding to the selected marker. Once the cover 252 is engaged with the cam actuator 234, the handle 260 may be rotated to a second tensioning position to effect the rotation of the cover assembly 250. This rotation of the cover assembly 250 imparts a rotational force through the cam actuator 234, via the cam actuation member 230, into the cam 222. The rotation of the cam 222 imparts a rotational force against the plunger 210. The plunger 210 translates the rotational force into the tensioning force provided by the tension spring 203. In an alternative embodiment, the rotation of the cam 222 imparts a rotation force to the pin 225. When the plunger 210 is coupled with the pin 225, the rotational force of the pin 225 operates upon the plunger 210 and is further translated into the tensioning force provided by the tension spring 203.

In operation, the tensioning mechanism 200 imparts its tensioning force to the saw blade 114 of the band saw 100 through the tension spring 203 being operationally disposed within the recessed area 107 defined within the sliding tension bracket 106. The first end 204 of the tension spring 203 engages against a surface of the recessed area 107 to enable a linear movement of the sliding tension bracket 106 relative to the upper arm 104. As previously described, the sliding tension bracket 106 is coupled with the upper band wheel 108, thus, the tensioning force provided by the tensioning mechanism of the present invention enables a corresponding linear movement of the upper band wheel 108. The plunger 210 is disposed within a defined second recessed area 117, a sleeve, established within the upper arm 104 and translates the rotational force provided by the cam assembly 220 into the tension spring 203 through linear movement within the sleeve 117 of the upper arm 104. Further, the cam 222 is disposed within a defined first recessed area 115 established within the upper arm 104 having the cam actuation member 230 extending through a cam recess 119, outside the upper arm 104 to engage with the cam actuator 234 and the pin 225 extending into a pin recess 121 to provide additional support for the cam assembly 220. The cam 222 is enabled with rotational functionality within the first recessed area of the upper arm 104. The first and second recessed areas of the upper arm 104 establish apertures within the upper arm 104 of varying configuration. The apertures are in operational engagement, being open to one another. In the preferred embodiment, the first and second apertures are a continuous recessed area defined within the upper arm 104. In alternative embodiments the aperture provided by the sleeve is generally oriented perpendicularly to the aperture established by the first recessed area. It is understood that the aperture established within the upper arm 104 may be enabled as a single defined recessed area. It is understood that the radial movement of the cam 222 and the linear movement of the plunger 210 may be enhanced by providing a lubricant within the first and second recessed areas of the upper arm 104. Alternatively, the lubricant may be established only in the first recessed area and the plunger 210 may promote maintaining the lubricant around the cam 222.

This linear movement of the upper band wheel 108 results in the increase or decrease of the spacing between the upper band wheel 108 and the lower band wheel 110, which has the effect of increasing or decreasing the tension applied to the saw blade 114. The recesses disposed with the first side 254 of the cover 252 are positioned in accordance with the approximate linear distance required to achieve proper tensioning for various blade widths. The markers, which correspond with the recesses, provide the visual indication to the user for the positioning of the cover 252 relative to the cam actuator 234. For example, the marker 275 indicates a ¾ inch blade width and corresponds with a recess. The recess may be engaged by the cam actuation pin 239. With the pin 239 engaged, the rotation of the handle 260 into the second tensioning position imparts a rotational force through the cam assembly 220 which is translated by the tension spring 203 into the tensioning force which moves the sliding tension bracket 106 a specific linear distance. Thus, the radial distance traveled by the handle 260 from the first tensioning position into the second tensioning position, with the recess in the cover 252 corresponding to the marker 275 indicating a ¾ blade engaged by the cam actuation pin 239, translates into an approximate linear distance required to achieve proper tensioning for the ¾" saw blade. It is understood that the other markers indicating other blade widths, such as those shown in FIG. 3A, and the corresponding recesses on the cover 252 enable different radial distances traveled by the handle 260 from the first tensioning position to the second tensioning position, which approximate the different linear distances required to be traveled by the sliding tension bracket 106 to achieve the proper tensioning for those blade widths indicated. It may be further understood that the larger width blades may require the upper band wheel 108 to be moved further away from the lower band wheel 110 to provide the proper tension. Otherwise stated, when the handle 260 and cover 252 are rotated to a set radial orientation, the alignment of a recess and the cam actuation pin 239 enables the user to adjust the linear position of the upper band wheel 108 with respect to the lower band wheel 110, upper arm 104, and frame 102. The selective index positioning capabilities, which are provided by the tensioning mechanism of the present invention, are preferably disposed to allow easy adjustment without interfering with the operation of the power tool. For example, the tensioning mechanism 200, employed with the band saw 100, is operationally established between the upper and lower band wheels at approximately arm height. Alternative positioning of the tensioning mechanism 200 may be enabled without departing from the scope and spirit of the present invention.

A securing assembly may be included with the tensioning mechanism 200 and provide a mechanism for securely affixing the handle 260 when the handle 260 has been rotated into the second position. The securing assembly includes a mounting member 280, which is engaged by a spring 281 coupled with a securing member 282. A fastener 286 is employed to fasten the spring 281 and securing member 282 with the mounting member 280. The fastener may be a bolt, screw, pin, clip, and the like, as contemplated. The securing member 282 is further disposed with a notch 284 proximal to an edge of the securing member 282. The notch 284 is configured to engage with the handle 260 and secure the handle 260 within the notch 284. The securing assembly is connected to the frame 102, via the mounting member 280, in a position enabling the engagement of the handle 260 when in the second tensioning position, with the notch 284. The securing assembly may be enabled using various systems, such as a compression locking assembly, as contemplated by those of ordinary skill in the art.

Figure 1C:
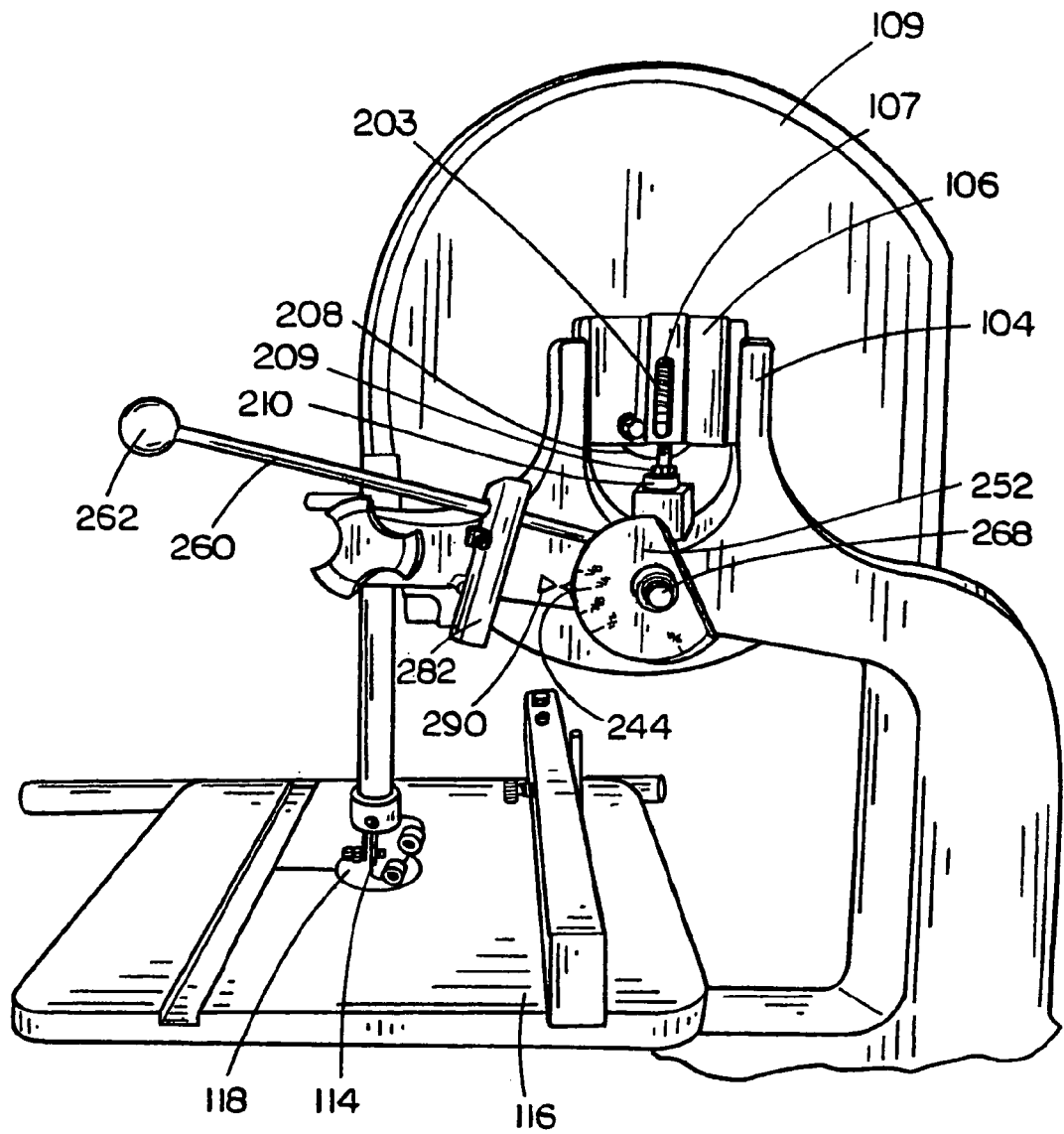
FIG. 1C is a side view of the tensioning mechanism of FIG. 1A coupled with the band saw and further including a securing assembly.
Figure 1D:
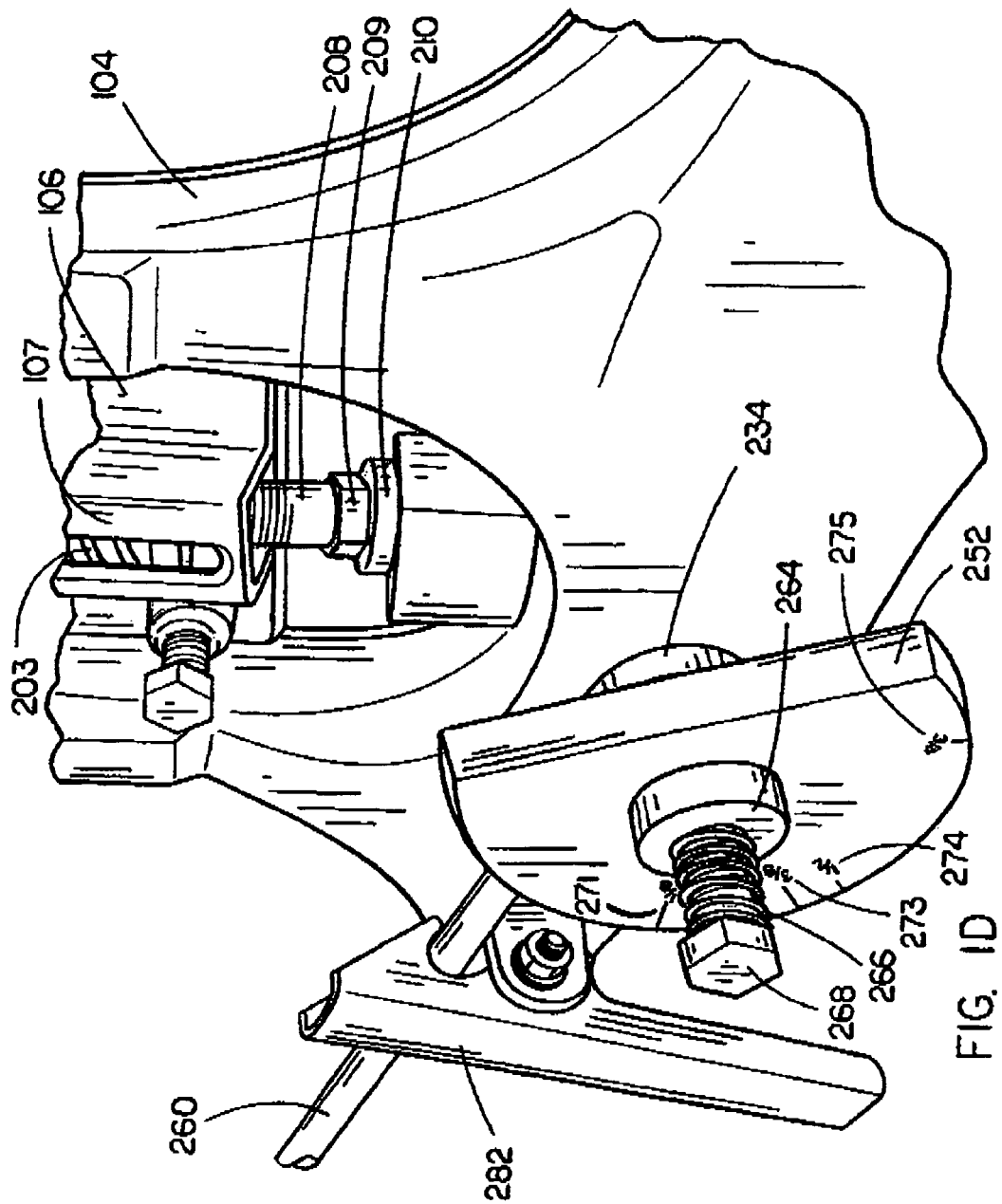
FIG. 1D is a perspective enlarged view of the tensioning mechanism of FIG. 1A including the securing assembly.

As shown in FIG. 1C, disposed on the upper arm 104 is a first upper arm indicator 290 which operationally engages with the cam actuation rib member 244 when the handle 260 is rotated into the second tensioning position, thereby rotating the cam actuator 234 which is engaged via the cam actuation pin 239 with the cover 252. The first upper arm indicator 290 provides a visual indication to the user of the corresponding blade width, identified by marker 272 as ¼", for the tensioning force being applied. It is contemplated that other indication systems may be include upon the upper arm 104 without departing from the scope and spirit of the present invention. For example, a display may provide a readout of the blade width for the tensioning force applied via rotation of the handle 260 into the second tensioning position. A series of light emitting diodes may establish a visual representation, such as a color coded light system for the different blade width tensioning capabilities of the present invention.

In alternative embodiments, the securing assembly may include a stop located on the upper arm 104 with the location of the stop corresponding to the location of the handle 260 when enabled in the second tensioning position. The stop may define the location of the second position for the handle 260 and provide a support to the handle 260. A further stop may be located on the upper arm corresponding to the position of the handle 260 when in the first tensioning position. It is contemplated that the tension handle may be enabled with a plurality of achievable tensioning positions. Further, the configuration and number of stops provided by the present invention may vary accordingly. The stops may be an internal securing assembly disposed within the upper arm 104 and engaging with the cam assembly 220. For instance, the securing assembly may be a compression assembly which establishes multiple stop positions. The stop positions may be overcome through manual rotation of the handle 260 or a release assembly may be provided. For example, a depression switch assembly may be disposed externally upon the upper arm 104 for engagement by a user of the band saw 100 when a repositioning of the handle 260 is desired. It is further contemplated that the release assembly may be disposed upon the handle 260 for engagement by the user. This would enable a quick release system of the positioning of the handle 260 and concomitantly the tensioning of the saw blade 114.

It is contemplated that the sliding tension bracket 104 may include a graduation assembly comprising a series of graduations which may be used in operational concert with various devices, such as a colored washer coupled with the second end 205 of the tension spring 203 as described previously, for tension spring 203 position indication. The graduation assembly indicates the tension spring position for various widths of blades; the blade widths indicated preferably correspond to the blade widths indicated on the cover 252 by the markers 271 through 275 of the index indicator 270.

It is understood that the tensioning mechanism 200 of the present invention may be employed with band saws which utilize alternate tensioning systems, such as a rack and pinion system without departing from the scope and spirit of the present invention.

In the current embodiment, the handle 260 is coupled with a ball knob 262. It is understood that the ball knob 262 may be a variety of devices, such as an L-shaped member or other contoured configurations as contemplated by one of ordinary skill in the art. Further, the composition of the ball knob 262 may vary, utilizing such materials as plastic, metal, wood, composites, and the like. Preferably, the coupling occurs through a threaded connection between the ball knob 262 and the handle 260. Other fastening assemblies, such as compression lock assemblies, may be employed without departing from the scope and spirit of the present invention. It is also contemplated that the ball knob 262 may be integrated with the handle 260. The location of the ball knob 262 upon the handle 260 may also vary to accommodate differing user and/or manufacturer needs. The ball knob 262 may be engaged by the user of the band saw to adjust the biasing and/or tensioning positions of the handle 260.

In FIG. 1A, the present invention provides the handle 260 in the first tensioning position. With the handle 260 in the first tensioning position the tensioning mechanism 200 is not applying a tension to the saw blade 114 through the upper band wheel 108. Thus, the pin 225, while remaining engaged with the plunger 210, is not raising the plunger 210 to increase tension in the tension spring 203 which results in increased tension on the saw blade 114. In the second tensioning position, shown in FIG. 1C and 1D, the handle 260 indicates that the tensioning mechanism 200 is applying a tension, the amount of tension being identified by the blade width indicated by the marker with which the corresponding recess is engaged by the cam actuation pin 239, to the saw blade 114 through movement of the upper band wheel 108. The tensioning mechanism 200 is used in conjunction with the standard blade tensioning assembly, as described previously, to establish an operational tension setting. In operation, the establishing of the operational tension setting by the standard blade tensioning assembly is accomplished with the handle 260 in the second position whereby the tensioning mechanism 200 is applying an amount of tension. When the user of the band saw 100 is satisfied with the operational tension setting established by the standard blade tensioning assembly in combination with the tensioning mechanism 200 engaged in the second position, they may operate the band saw, decide not to operate the band saw, and/or utilize the fine adjustment assembly to make minor changes to the tension setting. After the user is finished operating the band saw, or if they decide not to operate it, the user may rotate the handle 260 back into the first tensioning position, thereby releasing the amount of tension on the saw blade 114 imparted through the tensioning mechanism 200 but maintaining the position of the standard blade tensioning assembly. Thus, warping of the blade and frame of the band saw may be prevented. Further, re-establishing the operational tension setting of the saw blade 114, should the user decide to use the band saw, may be accomplished simply by rotating the handle 260 back into the second tensioning position.

Referring generally now to FIGS. 4A through 6B, a second exemplary band saw 400 employing a second exemplary tensioning mechanism 500 is shown. A band saw 400, shown in FIG. 4A, generally comprises a frame 402 including an upper arm 404 adjustably coupled with a sliding tension bracket 406. The sliding tension bracket 406 defines a recessed area 407 and is further coupled with an upper band wheel 408. The upper band wheel 408, in the current embodiment, is at least partially surrounded by an upper housing 409 which couples with the frame 402. It is contemplated that the upper housing 409 may couple with the upper arm 404. The coupling of the upper band wheel 408 with the sliding tension bracket 406 enables rotational capabilities in the upper band wheel 408 and enables a vertical adjustment capability in the position of the upper band wheel 408, in coordinated operation with a tensioning mechanism 500, shown in FIG. 4B and described below. The frame 402 further couples with a lower band wheel 410. The lower band wheel 410 being at least partially encompassed by a lower housing 411 in the current embodiment. The lower band wheel 410 is imparted with angular momentum through an operational coupling with a motor 412. Thus the lower band wheel 410, imparted with a rate of rotation by the motor 412, is often referred to as the drive wheel.

The upper and lower band wheels are established in a common vertical plane but in a spaced-apart configuration. The upper and lower band wheels are engaged by a continuous loop saw blade 414. The mounting of the upper and lower band wheel enables them to rotate about parallel axes and impart angular momentum to the saw blade 414. A table 416 is coupled with the frame 402 and is operationally engaged by the saw blade 414. The saw blade 414 operationally engages through the table 416 via a throat plate 418. It is understood that the table 416 is mounted between the upper and lower band wheels.

In the current embodiment, the band saw 400 further includes a base 420. The base 420 may be of various dimensions and configurations as contemplated by those of ordinary skill in the art. The base 420 may be enabled to house the motor 412 and allow for operational engagement between the motor 412 and the lower band wheel 410. It is contemplated that the base 420 may be of particular dimensions to accommodate various additional apparatus and systems which may be employed in conjunction with the band saw 400. For instance, a dust collection system may be coupled with the band saw 400 and enabled in its functionality, at least partially, through the base 420, as will be shown and described below. It is understood that other configurations and functional capabilities may be employed for and with the band saw 400 as contemplated by one of ordinary skill in the art.

Figure 4A:
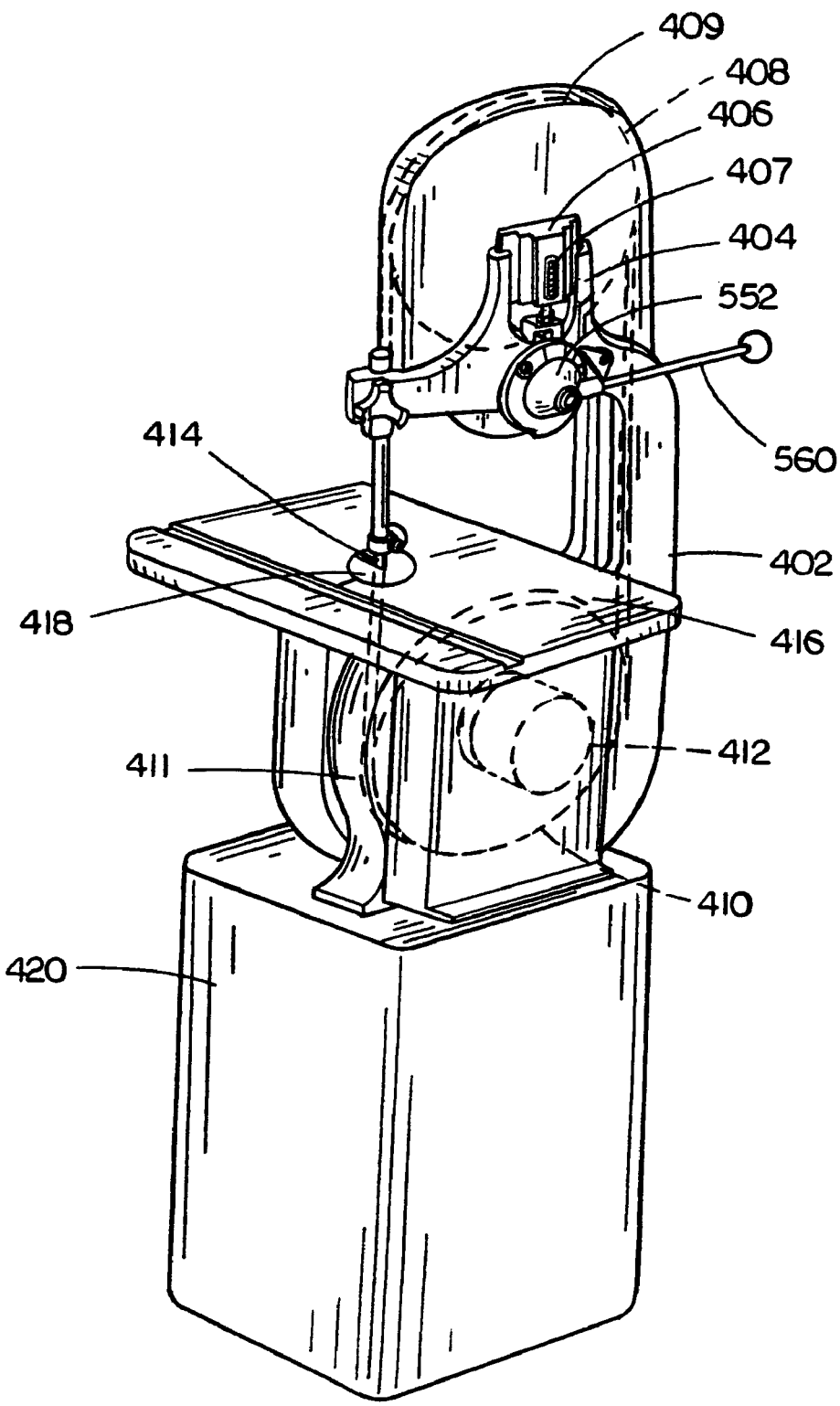
FIG. 4A is a perspective view of a second exemplary band saw employing a second exemplary embodiment of a tensioning mechanism in accordance with the present invention.
Figure 4B:
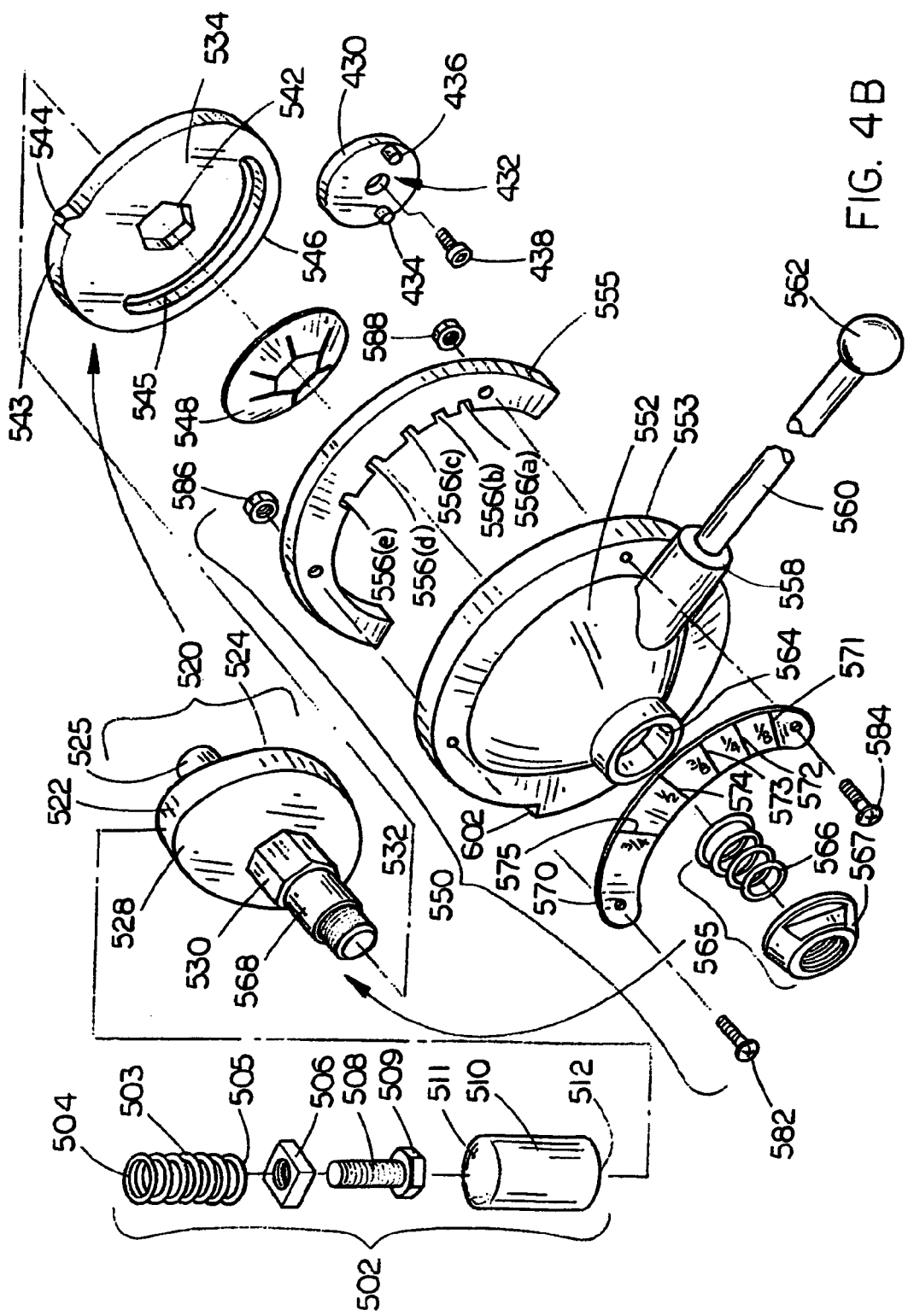
FIG. 4B is an exploded view of a tension spring assembly, a cam assembly, and a cover assembly of the tensioning mechanism of FIG. 4A.

The tensioning mechanism 500 is shown in FIG. 4B. In general, the tensioning mechanism 500 may assist in overcoming the difficulty associated with changing loop blades, such as saw blade 414 on band saw 400, similar to the advantage of the tensioning mechanism 200. When switching between blades, the ability to vary the tension to accommodate different blade widths helps to ensure the maintenance of a uniform tension on the different blades and may assist in minimizing potential accidents, reduce stress on the blade and saw frame, promote uniform/accurate cuts, and the like. For example, when switching between a one-eighth inch ($\frac{1}{8}$") to a one-half ($\frac{1}{2}$") inch blade the tension may be required to be adjusted to minimize the play in the blade. For instance, maintaining the tension on the saw blade at an optimal, approximate, 15,000 pounds per square inch (PSI) may require the user to increase or decrease the distance the loop blade travels or is extended about the upper and lower band wheels. Those of skill in the art will appreciate that the optimal pressure rating may vary depending on the blade/saw system and it is the intention of this disclosure to encompass and include such variation. The tensioning mechanism 500, of the present invention, enables such tension adjustment and may assist in helping the user to avoid over tensioning. As will be described below, the tensioning mechanism 500 of the present invention includes an advantageous indexing capability which may promote quicker and more accurate tension adjustments.

In the preferred embodiment, the tensioning mechanism 500 includes a tension spring assembly 502, a cam assembly 520, a cover assembly 550, and an index indicator 570. In general, the tension spring assembly 502, cam assembly 520, cover assembly 550, and index indicator 570 operationally couple together and engage with the sliding tension bracket 406 via the upper arm 404.

The tension spring assembly 502 includes a tension spring 503 which provides a tensioning force for the band saw 400. Preferably, the tension spring 503 is a compression spring. It is understood that specific dimensions of the tension spring 503, such as the size, configuration, thickness, and the like, may vary to accommodate the needs of a particular power tool with which the present invention may be employed. In the preferred embodiment, the tension spring 503 may be composed of a generally thicker coil. The tension spring 503 has a main axis and is defined by a first end 504 and a second end 505. A fine adjustment assembly, including a nut 506 and a variable length member 508 coupled with a mechanical connection 509, is disposed in proximal relation to the second end 505 of the tension spring 503. The nut 506 is capable of accepting the variable length member 508. In the current embodiment, the variable length member 508 includes a threaded section and is disposed with the mechanical connection 509. The mechanical connection 509 being a hex head, so that the mechanical connection 509 of the variable length member 508 is accessible to a hand tool, i.e., an open end box wrench or the like. A plunger 510 includes a first end 511 which engages with the variable length member 508. The plunger 510 includes a second end 512 which provides the coupling of the tension spring assembly 502 with the cam assembly 520 and may promote lubricant around the coupling point.

The fine adjustment assembly may promote fine adjustments of the tensioning force provided by the tension spring 503. This may be accomplished through engagement with the mechanical connection 509. In the current embodiment, the mechanical connection 509 is a hex head disposed on the end of the variable length member 508 which engages with the plunger 510. The user of the present invention may engage a wrench against the hex head and through rotation of the hex head cause the variable length member 508 to rotate. The rotation of the variable length member 508 causes the nut 506 to be displaced along the length of the threaded section of the member 508. Therefore, depending on the direction of rotation of the hex head the nut 506 may be moved up the threaded section away from the hex head or down the threaded section towards the hex head. When the nut 506 is moved up the threaded section, the tensioning of the tension spring 503 is increased thereby increasing the tensioning force provided by the tension spring 503. When the nut 506 is moved down the threaded section, the tensioning of the tension spring 503 is decreased thereby decreasing the tensioning force provided by the tension spring 503. It is understood that alternate fine adjustment systems may be employed without departing from the scope and spirit of the present invention. For example, a ratchet system or latch system may be employed to enable the fine adjustment of the tension spring 503.

A further alternative enablement of a fine adjustment assembly may include extending the variable length member 508. The extended variable length member 508 may extend above the upper housing 409 of the band saw 400. It is understood that the extension length may be varied to accommodate different user and/or manufacturer needs. With the variable length member 508 extended above the upper housing 409, a handknob may be coupled to the end which extends above the upper housing. The handknob may provide the exact same functionality as the hex head screw described previously. The user may rotate the handknob, clockwise or counterclockwise, to enable the movement of the nut 506 as described above. This may be advantageous in that the user may engage the handknob with a hand and not have to employ a tool to make a fine adjustment to the tensioning mechanism 500.

It is contemplated that an indicator may be included within the tension spring assembly 502 to identify to the user the relative tensioning force being applied. For example, a washer may be coupled between the nut 506 and the second end 505 of the tension spring 503. The washer may provide a visual indication to the user of the positioning of the tension spring and thereby indicate to the user the tensioning force being applied. It is further contemplated that the indicator may be of various colors which may increase the ease with which the user is able to identify the indicator. Further, the configuration of the indicator may be varied as contemplated by those of ordinary skill in the relevant art.

The cam assembly 520 is generally positioned adjacent to the tension spring assembly 502 to provide a rotational force which the tension spring assembly 502 translates into the tensioning force. The cam assembly 520 generally comprises a cam 522, a pin 525, a cam actuation member 530, a cam actuator 534, and a cam coupling member 548. The cam 522 includes a first side 524 and a second side 528. The cam 522 is generally somewhat oval in shape but it is contemplated that the cam 522 may be of various design configurations to accommodate the needs of the power tools with which the present invention may be employed. The pin 525 is a cylindrically shaped element including a first end 526 and a second end 527. The length and shape of the pin 525 may vary as contemplated. The second end 527 of the pin 525 connects with the first side 524 of the cam 522. In the preferred embodiment, the pin 525 connects with the cam 522 proximal to a bottom edge of the cam 522. The location of the connection of the pin 525 with the cam 522 may be changed without departing from the scope and spirit of the present invention.

In the current embodiment of the tensioning mechanism 500, the coupling of the spring tension assembly 502 with the cam assembly 520 is through the seating of the plunger 510 upon the cam 522. In operation the second end 512 of the plunger 510 is operationally coupled/seated/engaged against the cam 522. In an alternative embodiment, the plunger 510 may be seated upon the pin 525. In operation the second end 512 of the plunger 510 is coupled/seated/engaged against the pin 525, proximal to the first end 526 of the pin 525. It is further contemplated that the plunger 510 may engage against various surfaces established for providing the operational functionality described above and disposed upon the cam 522. For example, an integrated protrusion extending away from the cam 522 may provide the engagement surface for the plunger 510.

The second side 528 of the cam 522 is connected with the cam actuation member 530. On the end opposite the connection of the cam actuation member 530 with the cam 522, the cam actuation member 530 includes a receiver 532. The receiver 532, in the current embodiment is a threaded receiver which provides a coupling point for a variable length biasing member 568 of a biasing assembly 565, discussed below. It is contemplated that the cam actuation member 530 may be integrated with the variable length biasing member 568 or the variable length biasing member 568 may be removed from the cam actuation member 530 without departing from the scope and spirit of the present invention.

A cam actuator 534 is positioned adjacent to the cam 522 generally along the axis of rotation of the cam 522. The cam actuator 534 is coupled to the cam 522 via insertion of the cam actuation member 530 into and through a cam actuator receiver 542. In the current embodiment, the cam actuation member 530 is a generally cylindrical extension directed towards the cam actuator 534 which inserts through the cam actuator receiver 542 which is a generally cylindrical aperture extending from the first side 536 to the second side 538 of the cam actuator 534. Alternatively, the configuration of the cam actuation member 530 and the cam actuator receiver 542 may assume various geometric shapes without departing from the scope and spirit of the present invention. It is understood that the mechanical coupling of the cam actuator 534 with the cam 522 may vary as contemplated by those of ordinary skill in the relevant art.

The cam actuator 534 further includes a rotation support 545 disposed along a bottom edge 546 of the cam actuator 534. The rotation support 545, in the current embodiment, is an aperture of a generally arc shape. The rotation support 545 couples with a support element 430 which itself is coupled with the frame 402. Alternatively, the position of the support element may vary to accommodate the needs of various users and manufacturers of power tools. The support element 430 provides a slot 432 defined by a first support member 434 and a second support member 436. One of the two support members engages directly through the rotation support 545. Thus, as the cam actuator 534 is rotated during the tensioning of the tension mechanism 500, the support members track along the bottom edge 546 and within the rotation support 545. It is contemplated that the rotation support and support element herein presently described may be varied in configuration without departing from the scope and spirit of the present invention.

Disposed upon the top edge 543 of the cam actuator 534 is a cam actuation tongue member 544. The tongue member 544 is engaged with the cover assembly 550 to effect the operation of the tensioning mechanism 500, as will be discussed below.

The cover assembly 550 includes a cover 552 having a first side 553 defining a recessed area 554 and a second side 557. The defined recess 554 includes an index member 555 which is enabled to couple with the recessed area 554 and along which is disposed a series of indentations 556(a), 556(b), 556(c), 556(d), and 556(e), which may be engaged by the cam actuation tongue member 544 of the cam actuator 534. The indentations 556(a), 556(b), 556(c), 556(d), and 556(e) in the preferred embodiment, establish grooves within the index member 555 which may be selectively engaged by the cam actuation tongue member 544. The indentations enable the cover 552 of the cover assembly 550 to be established in a plurality of index positions relative to the cam actuator 534. It is understood that the indentations 556(a), 556(b), 556(c),

556(*d*), and 556(*e*) are exemplary and the number, location, and configuration, of the indentations may vary without departing from the scope and spirit of the present invention.

The cover 552 is generally spherically shaped and is disposed with an index indicator 570 on the second side 556. The index indicator 570, which includes a series of markers (preferably visual markers), may be established on the second side 557 of the cover 552. In the current embodiment, a first marker 571 comprises a first line with a "⅛", a second marker 572 comprises a second line with a "¼", a third marker 573 comprises a third line with a "⅜", a fourth marker 574 comprises a fourth line with a "½", and a fifth marker 575 comprises a fifth line with a "¾".

In the preferred embodiment, the index indicator 570 and the index member 555 are coupled with the cover 552 through the use of fasteners, i.e., bolts. A first bolt 582 is coupled by a first locking nut 586 and a second bolt 584 is coupled by a second locking nut 588. The bolts extend through the index indicator 570, the cover 552, the index member 555 and the locking nuts engages against the index member 555 with the bolts. This enables the index indicator 570 and index member 555 to be removed from the cover 552. Alternatively, the index indicator 570 may be engaged against the second side 557 of the cover 552 by separate fasteners than those that couple the index member 555 with the defined recessed area 554 of the first side 553. It is contemplated that alternative secondary index indicators and index members may be coupled with the cover 552 to enable various alternative functionalities, i.e., indexing positions for different blade widths. It is further contemplated that these various secondary index indicators and index members correspond with one another in providing indexing functionality.

The present invention also contemplates that the index indicator 570 and/or index member 555 may be integrated with the cover 552. In this manner the cover 552 may be removed from a band saw enabled with the tensioning mechanism of the present invention and replaced with an alternative secondary cover. These various secondary cover may enable various alternative functionalities, i.e., indexing positions for different blade widths. Further, the secondary covers may enable the use of different handles for engagement by the user of the band saw.

In FIG. 4B, it is shown that the lines generally extend to the edge of the second side 557 of the cover 552. This enables an indicator 590, which couples with the upper arm 404 in the preferred embodiment, to indicate which index position the tensioning mechanism 500 is established in. For example, the indicator 590, disposed proximal to the cover 552, may enable a user to visually identify which index position the tensioning mechanism 500 is currently in by ascertaining which of the markers is aligned with the indicator 590.

It is understood, that in this exemplary embodiment, each marker 571 through 575 may correspond with the position of the indentations 556(*a*), 556(*b*), 556(*c*), 556(*d*), and 556(*e*) shown in FIG. 4B, located on the index member 555 coupled within the defined recess area 554 of the cover 552. Therefore, each marker, in combination with its corresponding indentation, establishes an index position into which the cover assembly 550 may be selectively engaged. This ability to selectively engage the cover assembly 550 into various index positions is described below.

Figure 5:
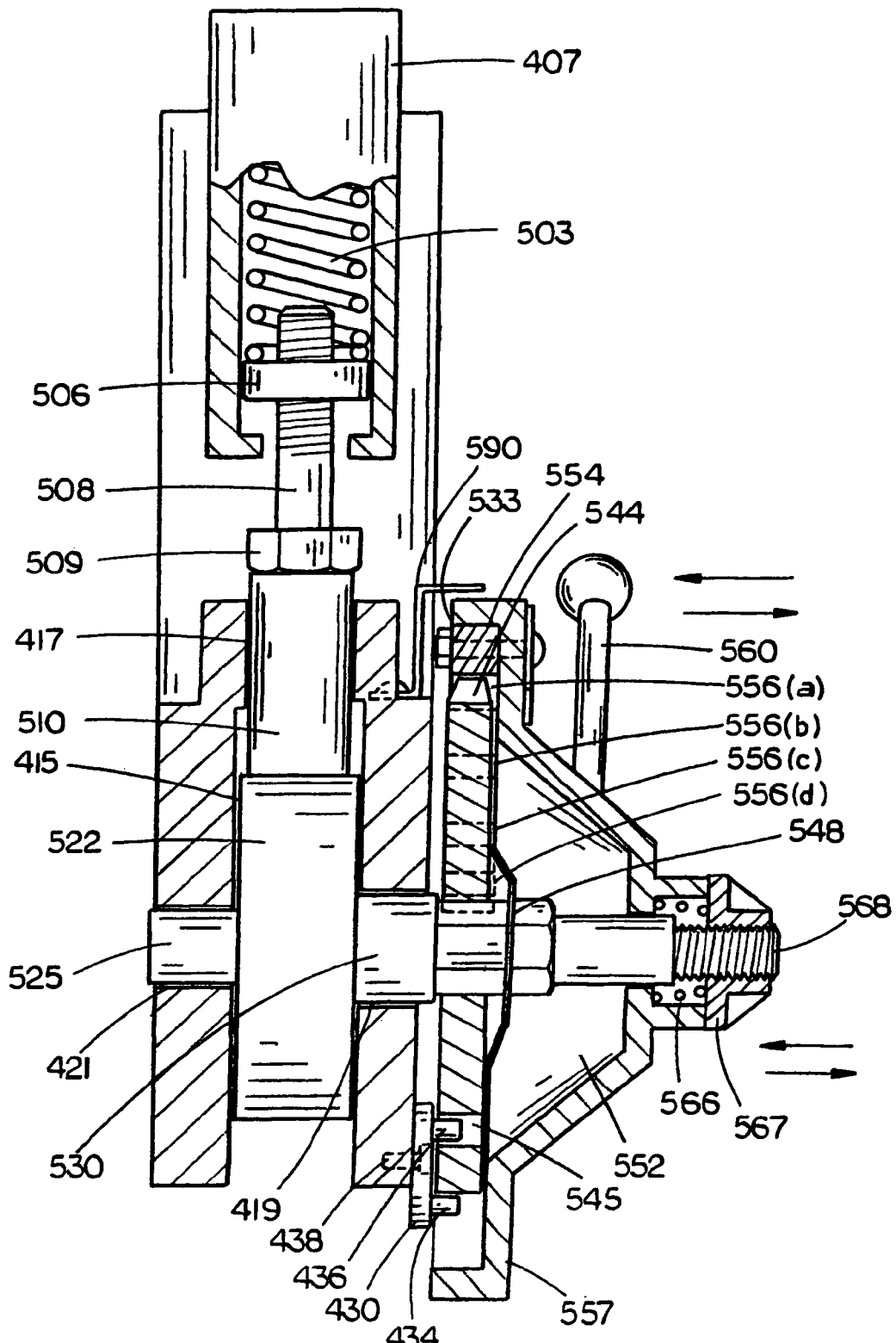
FIG. 5 is a cut-away view of the tensioning mechanism of FIG. 4A including the tension spring assembly coupled with the cam assembly coupled with the cover assembly.

The establishment of the cover assembly 550 into various index positions is enabled by a handle 560, which may be adjusted from a first biasing position, which may correspond with the first tensioning position described above and discussed below, into a second biasing position, via a biasing assembly 565. The direction of movement between the first and second biasing positions is indicated in FIG. 5 by the two sets of arrows. The biasing assembly 565 includes a biasing spring 566 coupled with the cam coupling member 548 and a biasing element 567 which couples with a variable length biasing member 568. The biasing spring 566 and the variable length biasing member 568 couple with a biasing element receiver 564 disposed upon the cover 552. The biasing spring 566 couples against the cam coupling member 548 using the cam coupling member 548 as a stop against which the spring 566 exerts a force depending on the biasing position of the handle 560. In the preferred embodiment, the variable length biasing member 568 is a threaded rod which on one end is coupled with the receiver 532 of the cam actuation member 530 and on the opposite end couples with the biasing element 567 and biasing spring 566. It is understood that the biasing spring 566, biasing element 567, and variable length biasing member 568 may be enabled to couple with the various secondary covers described previously. It is contemplated that various secondary biasing springs may be utilized in order to enable different biasing forces. For example, a user may prefer a tighter feel in the biasing positioning, therefore, a heavier secondary biasing spring may be employed.

The cam coupling member 548 may function to enable the biasing and tensioning capabilities of the present invention. In the preferred embodiment, the cam coupling member 548 is coupled the variable length biasing member 568. For example, when the handle 560 is in the first biasing position, which is also the first tensioning position, the cover assembly 550 is engaging the cam assembly 520. The force being exerted upon the cam coupling member 548 may enable the cam coupling member 548 to assist in enabling the rotation of the cover 552 and the exertion of the rotational force, translated through the variable length biasing member 568, to rotate the cam assembly 520. Alternatively, when the handle 560 is biased out into the second biasing position, the cam coupling member 548 may function to assist the cam assembly 520 in staying in a fixed position. Further, the cam coupling member 548 may enable the cover assembly 550 to be rotated relative to the cam assembly 520. It is understood that alternative configurations of the cam coupling member 548 may be employed without departing from the scope and spirit of the present invention.

The handle 560 couples with a handle receiver 558 disposed upon the cover 552. The handle receiver 558 may couple with the handle 560 via a threaded bore, compression lock assembly, latch assembly, and the like. In the preferred embodiment, the handle 560 includes a ball knob 562 coupled to the end opposite the handle's 560 coupling with the cover 552 via the handle receiver 558. The handle may be of various configurations as contemplated. The handle 560 assists in enabling the rotational movement capabilities and selective engagement capabilities of the cover 552.

The biasing assembly 565 further assists in enabling the rotational movement and selective engagement capabilities of the cover 552. The biasing element receiver 564 is an aperture that extends from the second side 557 through to the first side 553 of the cover 552. The location of the biasing element receiver 564 enables the variable length biasing member 568 to extend through the cover 552 and engage the threaded section of the variable length biasing member 568 into the receiver 532 of the cam actuation member 530. The engagement of the variable length biasing member 568 with the cam actuation member 530 connects the cover assembly 550 with the cam assembly 520.

In order to set the cover assembly 550 into a desired index position the user may engage with the handle 560. The user may pull (bias) the handle 560 out from the first biasing position into the second biasing position. The handle 560 in the second biasing position establishes the cover 552 away from the cam actuator 534, thereby disengaging the cam actuation tongue member 544 from its seat within one of the indentations disposed on the index member 555 of the defined recessed area 554 of the first side 553 of the cover 552. In the present embodiment, the indentations of the index member 555 of the cover 552, corresponding to the markers 571 through 575 (exemplified by the FIG. 5), are positioned in accordance with the approximate linear distance required to achieve proper tensioning for the blade width identified by the markers 571 through 575. With the handle 560 in the second biasing position and cover 552 biased into the disengaged position, the user may then rotate the handle 560, which has the effect of rotating the cover 552 relative to the cam actuator 534 and the cam actuation tongue member 544, until the user has reached the desired index position. The user may identify that the desired index position has been reached through visual ascertainment of the alignment of an indicator 590 with the line of the marker of the index indicator 570 corresponding with the number (e.g., ⅛, ¼., ⅜, ½, and ¾) which identifies the width of the saw blade being used, described below. It is contemplated that alternative indexing position alignment systems may be employed.

Once the user has made the visual alignment of the cam actuation tongue member 544 with the desired marker 571 through 575, the user may release the handle 560 which places the handle 560 into the first biasing position which corresponds with a first tensioning position for the handle 560. When the handle 560 is established into the first tensioning position, the biasing force provided by the biasing spring 566 causes the cover 552 to be engaged against the cam actuator 534. This has the effect of engaging the cam actuation tongue member 544 within the indentation defined on the index member 555 of the cover 552, corresponding to the selected marker. Once the cover 552 is engaged with the cam actuator 534, the handle 560 may be rotated to a second tensioning position to effect the rotation of the cover assembly 550. The direction of rotation of the cover assembly 550 is identified by a double arrowhead line in FIG. 6A. This rotation of the cover assembly 550 imparts a rotational force through the cam actuator 534, via the cam actuation member 530, into the cam 522. The rotation of the cam 522 imparts a rotational force against the plunger 510. The plunger 510 translates the rotational force into a linear force against the tension spring which then applies the desired tensioning force. In an alternative embodiment, the rotation of the cam 522 imparts a rotation force to the pin 525. When the plunger 510 is coupled with the pin 525, the rotational force of the pin 525 operates upon the plunger 510 and is further translated into the tensioning force provided by the tension spring 503.

In operation, the tensioning mechanism 500 imparts its tensioning force to the saw blade 414 of the band saw 400 through the tension spring 503 being operationally disposed within the recessed area 407 defined within the sliding tension bracket 406. The first end 504 of the tension spring 503 engages against a surface of the recessed area 407 to enable a linear movement of the sliding tension bracket 406 relative to the upper arm 404. As previously described, the sliding tension bracket 406 is coupled with the upper band wheel 408, thus, the tensioning force provided by the tensioning mechanism of the present invention enables a corresponding linear movement of the upper band wheel 408. The plunger 510 is disposed within a defined second recessed area 417, a sleeve, established within the upper arm 404 and translates the rotational force provided by the cam assembly 520 into the tension spring 503 through linear movement within the sleeve 417 of the upper arm 404. Further, the cam 522 is disposed within a defined first recessed area 415 established within the upper arm 404 having the cam actuation member 530 extending through a cam recess 419 outside the upper arm 404 to engage with the cam actuator 534 and the pin 525 extending into a pin recess 421 to provide additional support for the cam assembly 520. The cam 522 is enabled with rotational functionality within the first recessed area of the upper arm 404. The first and second recessed areas of the upper arm 404 establish apertures within the upper arm 404 of varying configuration. The apertures are in operational engagement, being open to one another. In the preferred embodiment, the first and second apertures are a continuous recessed area defined within the upper arm 404. In alternative embodiments the aperture provided by the sleeve is generally oriented perpendicularly to the aperture established by the first recessed area. It is understood that the aperture established within the upper arm 404 may be enabled as a single defined recessed area. It is understood that the radial movement of the cam 522 and the linear movement of the plunger 510 may be enhanced by providing a lubricant within the first and second recessed areas of the upper arm 404. Alternatively, the lubricant may be established only in the first recessed area and the plunger 510 may promote maintaining the lubricant around the cam 522.

This linear movement of the upper band wheel 408 results in the increase or decrease of the spacing between the upper band wheel 408 and the lower band wheel 410, which has the effect of increasing or decreasing the tension applied to the saw blade 414. The indentations of the index member 555 of the first side 553 of the cover 552 are positioned in accordance with the approximate linear distance required to achieve proper tensioning for various blade widths. The markers, which correspond with the indentations, provide the visual indication to the user for the positioning of the cover 552 relative to the cam actuator 534. For example, the marker 575 indicates a ¾ inch blade width and corresponds with a recess. The indentations may be engaged by the cam actuation tongue member 544. With the tongue member 544 engaged, the rotation of the handle 560 into the second tensioning position imparts a rotational force through the cam assembly 520 which is translated by the tension spring 503 into the tensioning force which moves the sliding tension bracket 406 a specific linear distance. Thus, the radial distance traveled by the handle 560 from the first tensioning position into the second tensioning position, with the indentations in the cover 552 corresponding to the marker 575 indicating a ¾ blade engaged by the cam actuation pin 539, translates into an approximate linear distance required to achieve proper tensioning for the ¾" saw blade.

Figure 6A:
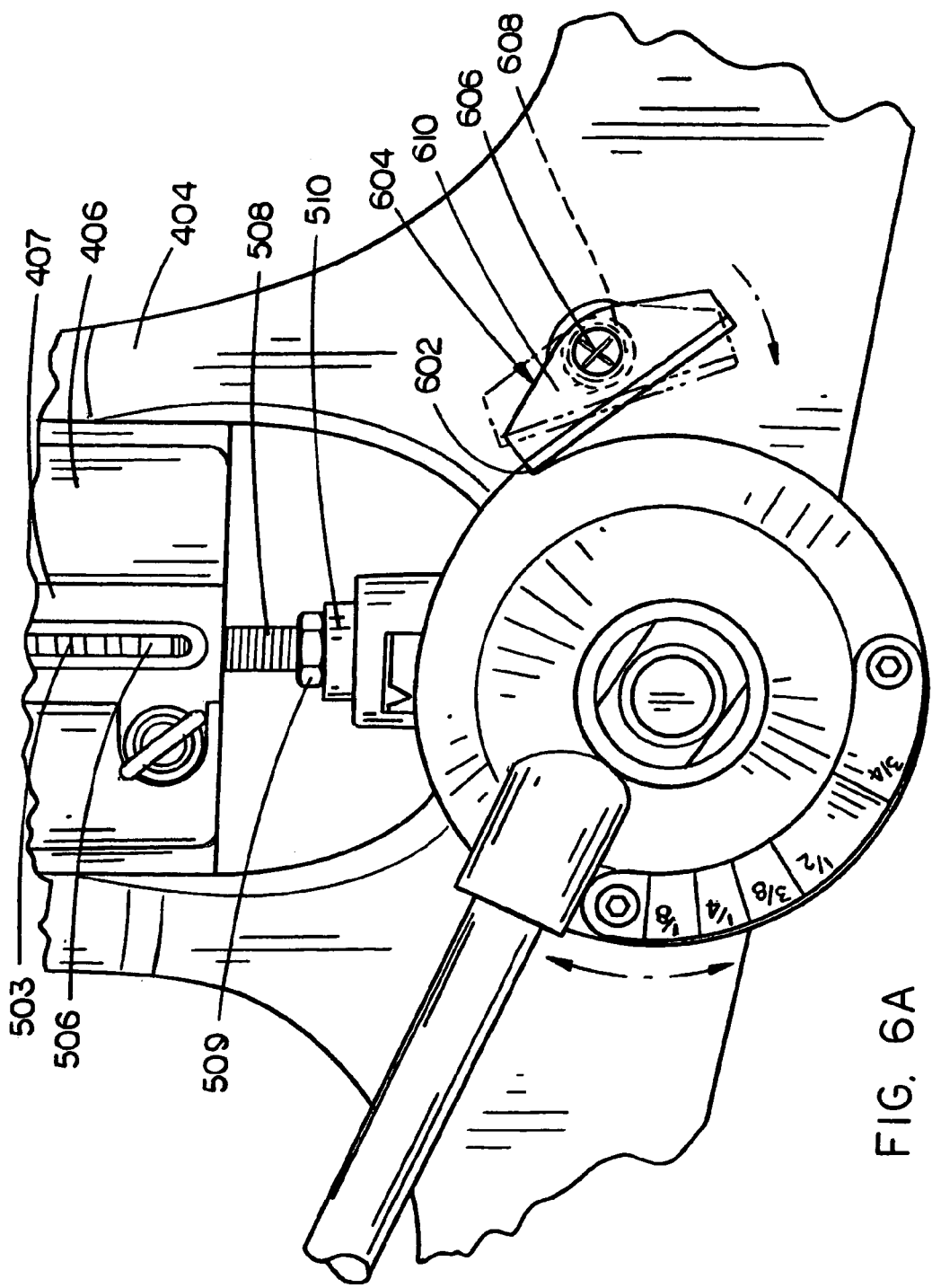
FIG. 6A is a side view of the tensioning system of FIG. 4A illustrating linear movement of a plunger coupled with a variable length member enabled through the rotation of the cover assembly.
Figure 6B:
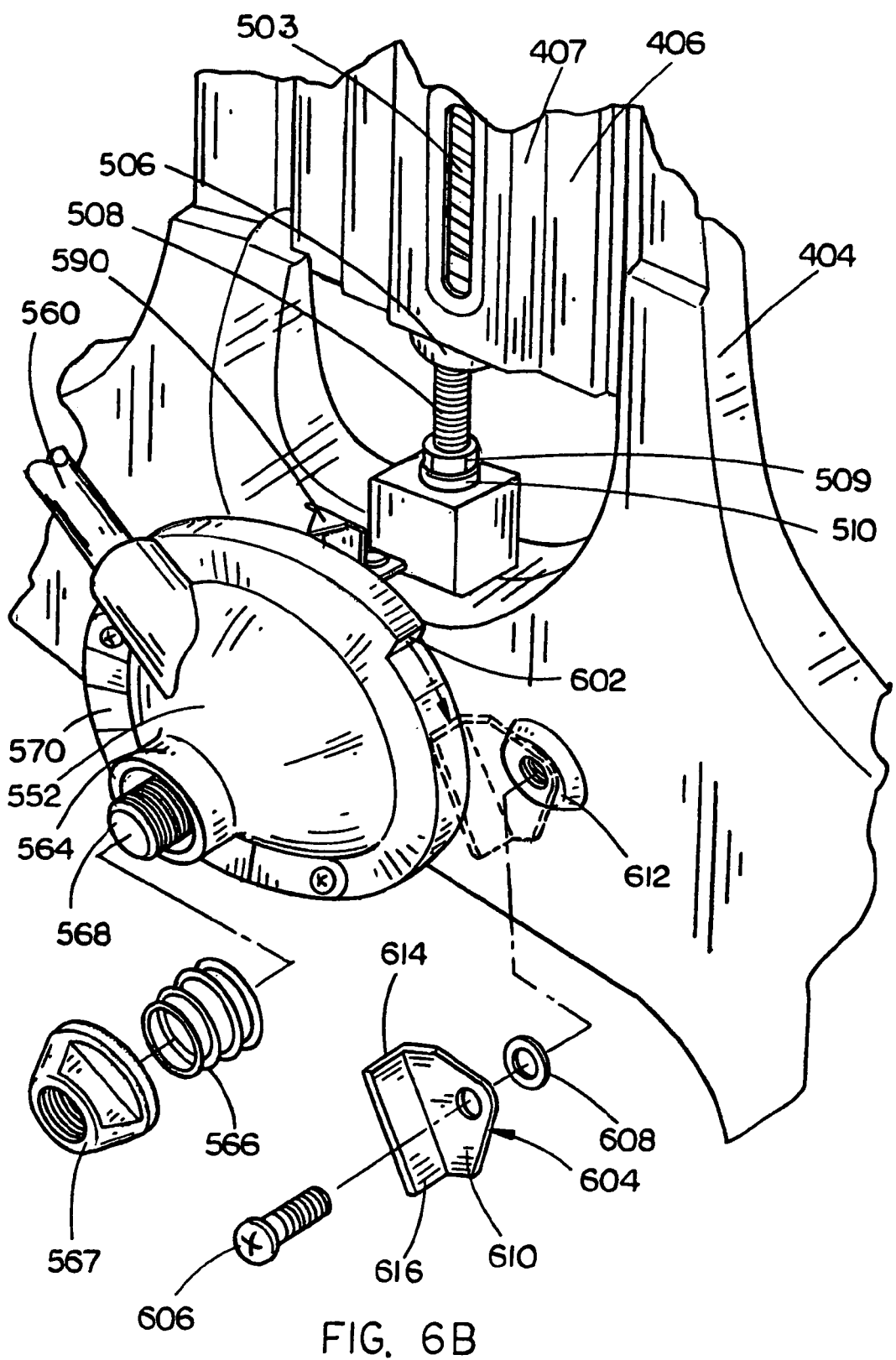
FIG. 6B is a front view illustrating a second exemplary embodiment of a securing assembly for engaging with the cover assembly and securing the position of the cover assembly.

It is understood that the other markers indicating other blade widths, such as those shown in FIG. 6A, and the corresponding indentations of the index member 555 on the cover 552 enable different radial distances traveled by the handle 560 from the first tensioning position to the second tensioning position, which approximate the different linear distances required to be traveled by the sliding tension bracket 406 to achieve the proper tensioning for those blade widths indicated. It may be further understood that the larger width blades may require the upper band wheel 408 to be moved further away from the lower band wheel 410 to provide the proper tension. Otherwise stated, when the handle 560 and cover 552 are rotated to a set radial orientation, the alignment of an indentation and the cam actuation tongue member 544 enables the user to adjust the linear position of the upper band wheel 408 with respect to the lower band wheel 410, upper arm 404, and frame 402. The selective index positioning capabilities, which are provided by the tensioning mechanism of the present invention, are preferably disposed to allow easy adjustment without interfering with the operation of the power tool. For example, the tensioning mechanism 500, employed with the band saw 400, is operationally established between the upper and lower band wheels at approximately arm height. Alternative positioning of the tensioning mechanism 500 may be enabled without departing from the scope and spirit of the present invention.

A securing assembly may be included with the tensioning mechanism 500 and provide for securely affixing the handle 560 when the handle 560 has been rotated into the second tensioning position. It is contemplated that the handle 560 may be established in more than two positions and the securing assembly may enable the plurality of positions. In the preferred embodiment, the securing assembly includes a ledge member 602 which is engaged by a lever assembly 604 coupled with the upper arm 404 and/or frame 402. The ledge member 602 is disposed upon the cover 552. It is contemplated that the ledge member 602 may be disposed in various locations upon the cover 552. The lever assembly 604 includes a fastener 606 employed to fasten a washer 608 and a securing member 610 with a mounting member 612. The fastener may be a bolt, screw, pin, clip, and the like, as contemplated. The securing member 610, in the current embodiment, is a lever which is enabled to rotate and engages a first end 614 against the cover 552 including the ledge member 602. In the current embodiment, the force of gravity acts upon the securing member 610 in order to maintain the first end 614 of the securing member 610 in contact with the cover 552. Alternatively, the securing member 610 may be engaged with a spring assembly which provides a force against the securing member 610 to keep it in contact with the cover 552 and ledge member 602. It is understood that various assemblies may be employed to maintain the securing member 610 in contact with the cover 552 and ledge member 602.

In operation, as the handle 560 is rotated into the second tensioning position the ledge member 602 is rotated past the first end 614 of the securing member 610. The rotation of the ledge member 602 past the first end 614 causes the securing member 610 to rotate, due to the force of the spring 608, and drop the first end 614 behind the ledge member 602. The cover 552, due to the rotational forces being exerted by the cam assembly 520 upon it, applies a counter-rotational force which, when the securing member 610 is positioned behind the ledge member 602, causes the ledge member 602 to engage against the first end 614 of the securing member 610. This engagement securely affixes the position of the cover 552, thereby enabling the second tensioning position of the handle 560.

When the user wishes to rotate the handle 560 back into the first tensioning position, a second end 616 of the securing member 610 may be engaged by the user to rotate the first end 614 out of contact with the ledge member 602. This enables the cover 552 to be rotated and establish the handle 560 and the cover 552 in the first tensioning position. The securing assembly may be enabled using various systems, such as a compression locking assembly, as contemplated by those of ordinary skill in the art.

In alternative embodiments, the securing assembly may include a stop located on the upper arm 404 with the location of the stop corresponding to the location of the handle 560 when enabled in the second tensioning position. The stop may define the location of the second position for the handle 560 and provide a support to the handle 560. A further stop may be located on the upper arm corresponding to the position of the handle 560 when in the first tensioning position. It is contemplated that the handle 560 may be enabled with a plurality of achievable tensioning positions. Further, the configuration and number of stops provided by the present invention may vary accordingly. The stops may be an internal securing assembly disposed within the upper arm 404 and engaging with the cam assembly 520. For instance, the securing assembly may be a compression assembly which establishes multiple stop positions. The stop positions may be overcome through manual rotation of the handle 560 or a release assembly may be provided. For example, a depression switch assembly may be disposed externally upon the upper arm 404 for engagement by a user of the band saw 400 when a re-positioning of the handle 560 is desired. It is further contemplated that the release assembly may be disposed upon the handle 560 for engagement by the user. This would enable a quick release system of the positioning of the handle 560 and concomitantly the tensioning of the saw blade 414.

Figure 4C:
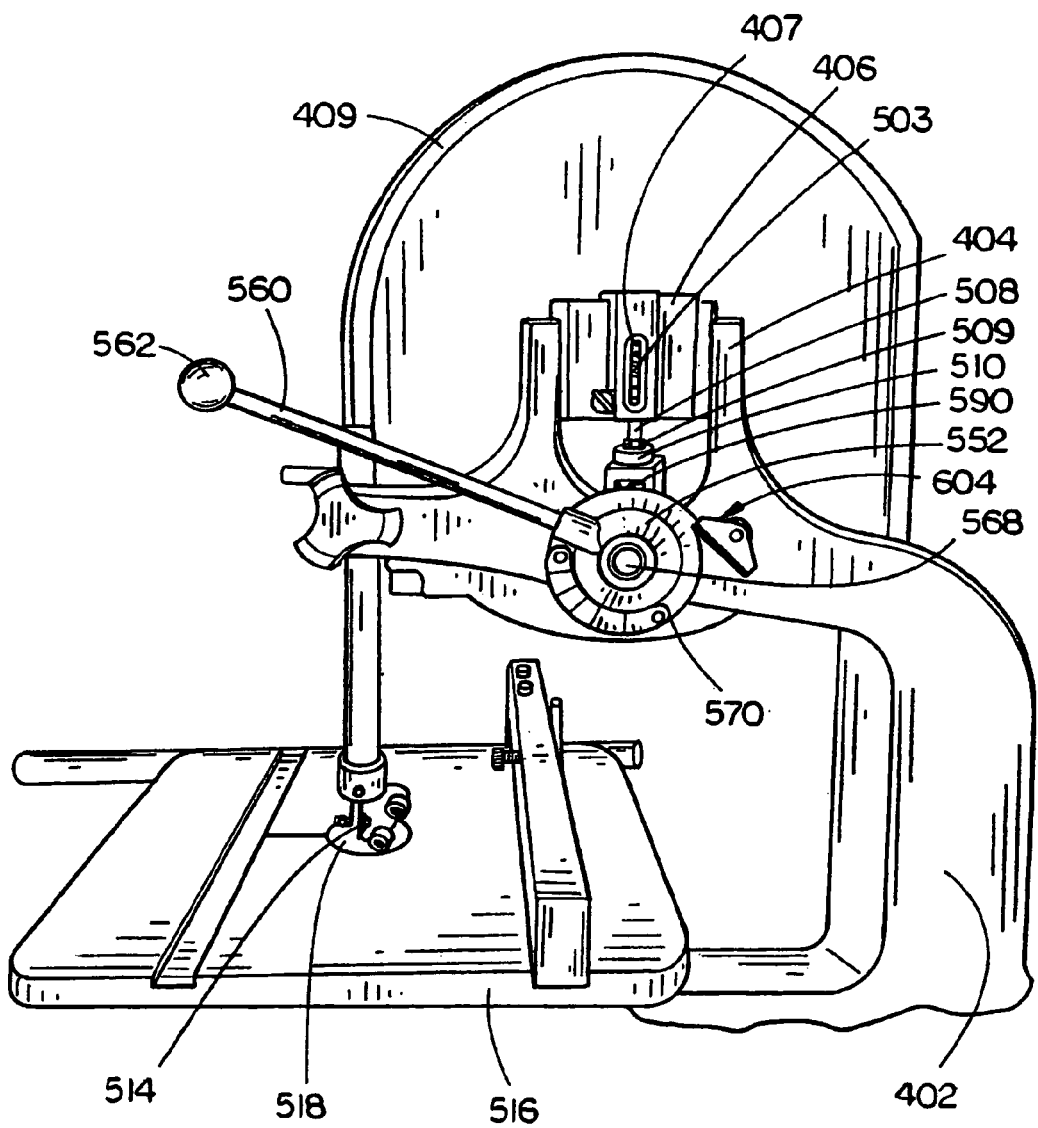
FIG. 4C is a side view of the tensioning mechanism of FIG. 4A coupled with the band saw and further including a securing assembly.
Figure 4D:
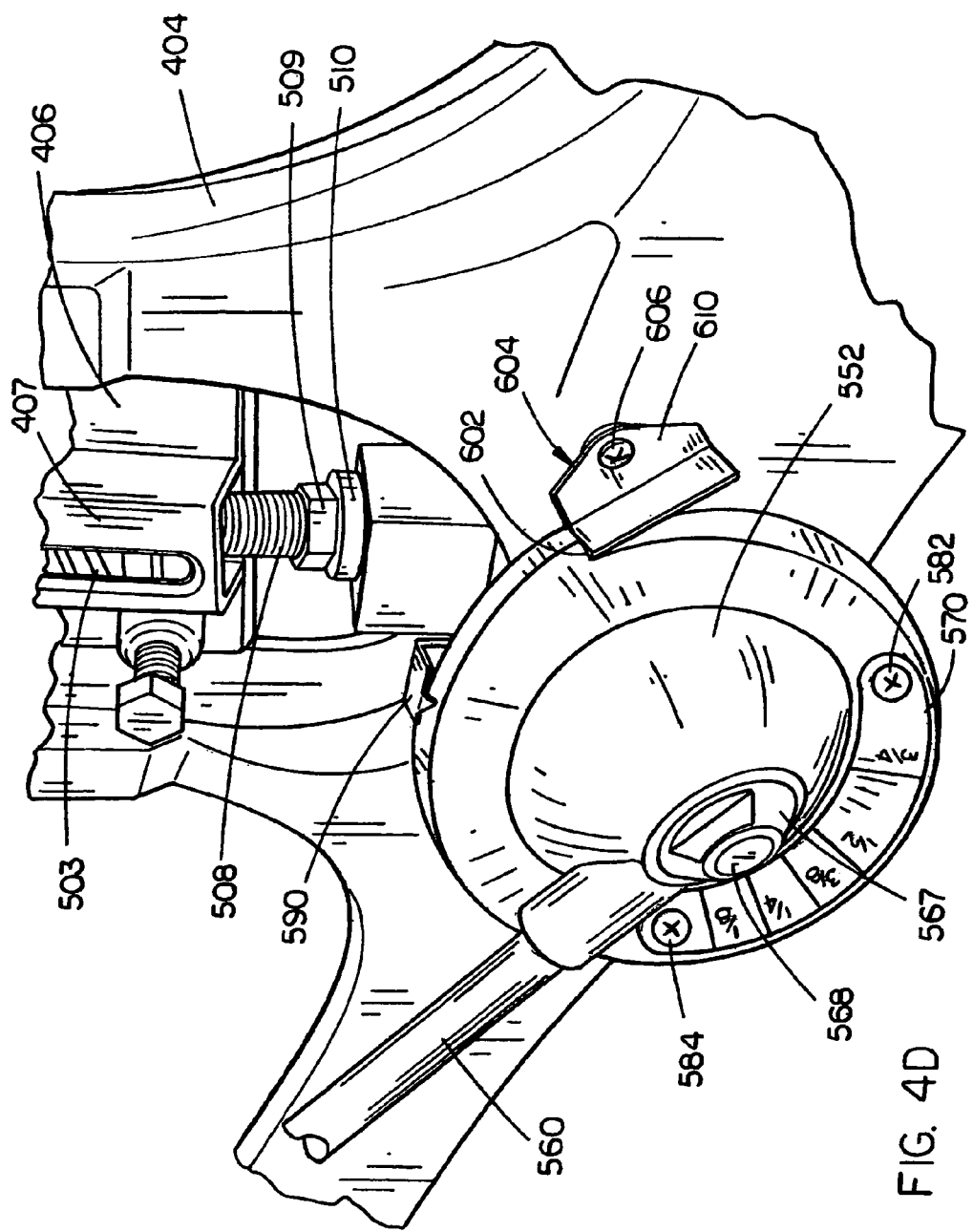
FIG. 4D is a perspective enlarged view of the tensioning mechanism of FIG. 4A including the securing assembly.

As shown in FIG. 4C, disposed on the upper arm 404 is the first upper arm indicator 590 which indicates the index position of the tensioning mechanism 500. The indicator 590 aligns with one of the markers 571 through 575 to visually identify the index position being selected. In operation, the handle 560 may be biased into the second biasing position which dis-engages the cam actuation tongue member 544 from the index member 555. In the second biasing position, the handle 560 may be rotated, which causes the cover 552 to rotate relative to the cam actuator 534. While rotating the handle 560, the user may visually align one of the markers of the index indicator 570 with the indicator 590. Through alignment of a selected marker with the indicator 590, the cover 552 may be established in the index position which corresponds to the marker selected. The cover 552 is established in the selected index position by releasing the handle 560 into the first biasing position which engages the tongue member 544 of the cam actuator 534 with the indentation of the index member 555 which corresponds with the marker selected. It is contemplated that other indication systems may be included upon the upper arm 404 and/or frame 402 without departing from the scope and spirit of the present invention. For example, the present invention may enable a display providing a read-out of the index positions/blade width positions and the corresponding tensioning force which will be applied via rotation of the handle 560 into the second tensioning position. A series of light emitting diodes may establish a visual representation, such as a color coded light system for the different blade width tensioning capabilities of the present invention.

It is contemplated that the sliding tension bracket 404 may include a graduation assembly comprising a series of graduations which may be used in operational concert with various devices, such as a colored washer coupled with the second end 505 of the tension spring 503 as described previously, for tension spring 503 position indication. The graduation assembly indicates the tension spring position for various widths of blades; the blade widths indicated preferably correspond to the blade widths indicated on the cover 552 by the markers 571 through 575 of the index indicator 570.

It is understood that the tensioning mechanism 500 of the present invention may be employed with band saws which utilize alternate tensioning systems, such as a rack and pinion system without departing from the scope and spirit of the present invention.

In the current embodiment, the handle 560 is coupled with a ball knob 562. It is understood that the ball knob 562 may be a variety of devices, such as an L-shaped member or other contoured configurations as contemplated by one of ordinary skill in the art. Further, the composition of the ball knob 562 may vary, utilizing such materials as plastic, metal, wood, composites, and the like. Preferably, the coupling occurs through a threaded connection between the ball knob 562 and the handle 560. Other fastening assemblies, such as compression lock assemblies, may be employed without departing from the scope and spirit of the present invention. It is also contemplated that the ball knob 562 may be integrated with the handle 560. The location of the ball knob 562 upon the handle 560 may also vary to accommodate differing user and/or manufacturer needs. The ball knob 562 may be engaged by the user of the band saw to adjust the biasing and/or tensioning positions of the handle 560.

In FIG. 4A, the present invention provides the handle 560 in the first tensioning position. With the handle 560 in the first tensioning position the tensioning mechanism 500 is not applying a tensioning force to the saw blade 414 through the upper band wheel 408. Thus, the cam 522, while remaining engaged with the plunger 510, is not raising the plunger 510 to increase tension in the tension spring 503 which results in increased tension on the saw blade 414. In the second tensioning position, shown in FIGS. 4C and 4D, the handle 560 indicates that the tensioning mechanism 500 is applying a tensioning force, the amount of tension being identified by the blade width indicated by the marker with which the corresponding indentation is engaged by the cam actuation tongue member 544, to the saw blade 414 through movement of the upper band wheel 408. The tensioning mechanism 500 is used in conjunction with the standard blade tensioning assembly, as described previously, to establish an operational tension setting. In operation, the establishing of the operational tension setting by the standard blade tensioning assembly is accomplished with the handle 560 in the second position whereby the tensioning mechanism 500 is applying an amount of tension. When the user of the band saw 400 is satisfied with the operational tension setting established by the standard blade tensioning assembly in combination with the tensioning mechanism 500 engaged in the second position, they may operate the band saw, decide not to operate the band saw, and/or utilize the fine adjustment assembly to make minor changes to the tension setting. After the user is finished operating the band saw or if they decide not to operate it the user may rotate the handle 560 back into the first tensioning position, thereby releasing the amount of tension on the saw blade 414 imparted through the tensioning mechanism 500 but maintaining the position of the standard blade tensioning assembly. Thus, warping of the blade and frame of the band saw may be prevented. Further, re-establishing the operational tension setting of the saw blade 414, should the user decide to use the band saw, may be accomplished simply by rotating the handle 560 back into the second tensioning position.

Figure 7:
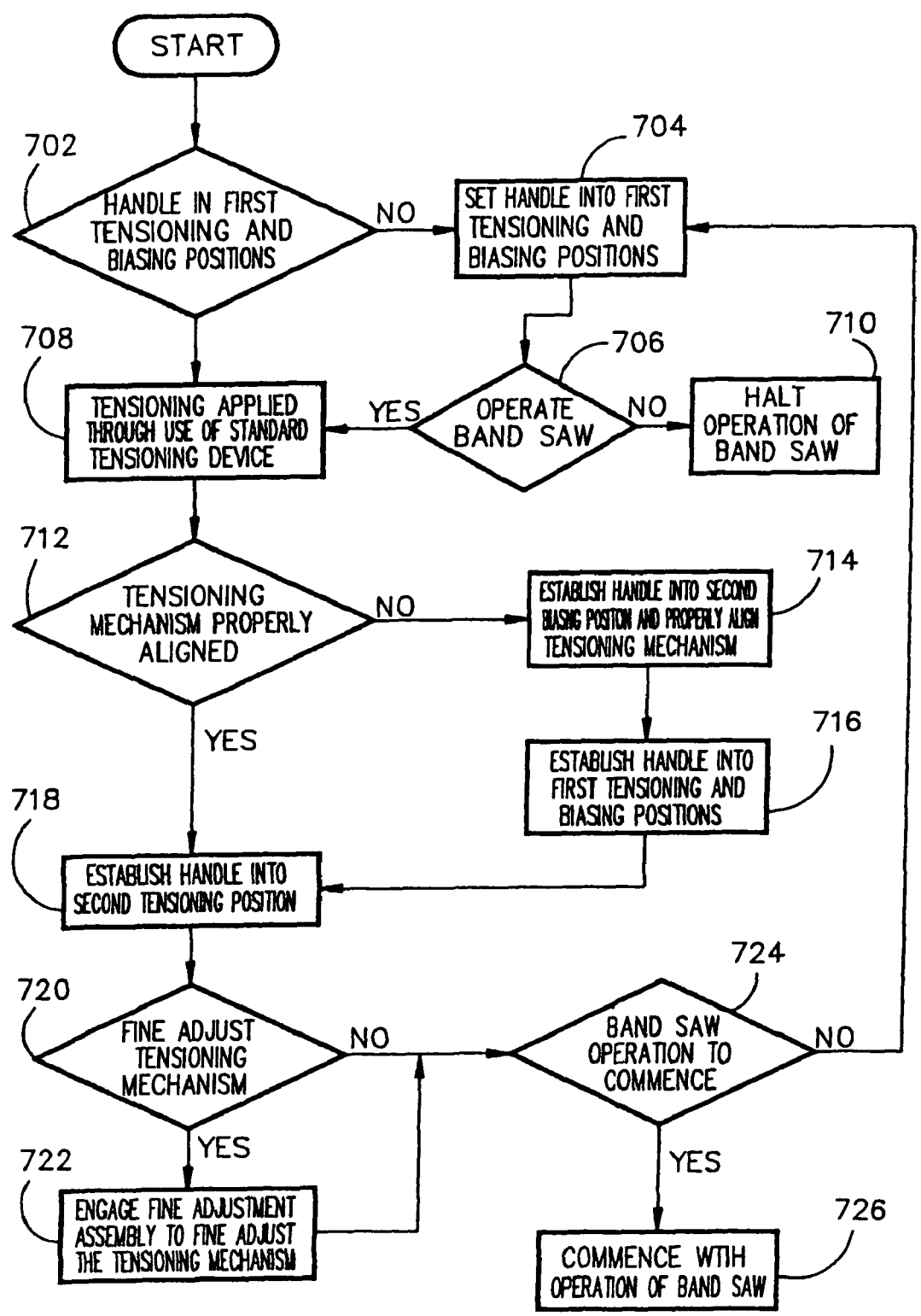
FIG. 7 is a method of operating the band saw including the tensioning mechanism in accordance with an exemplary embodiment of the present invention.
Figure 8A:
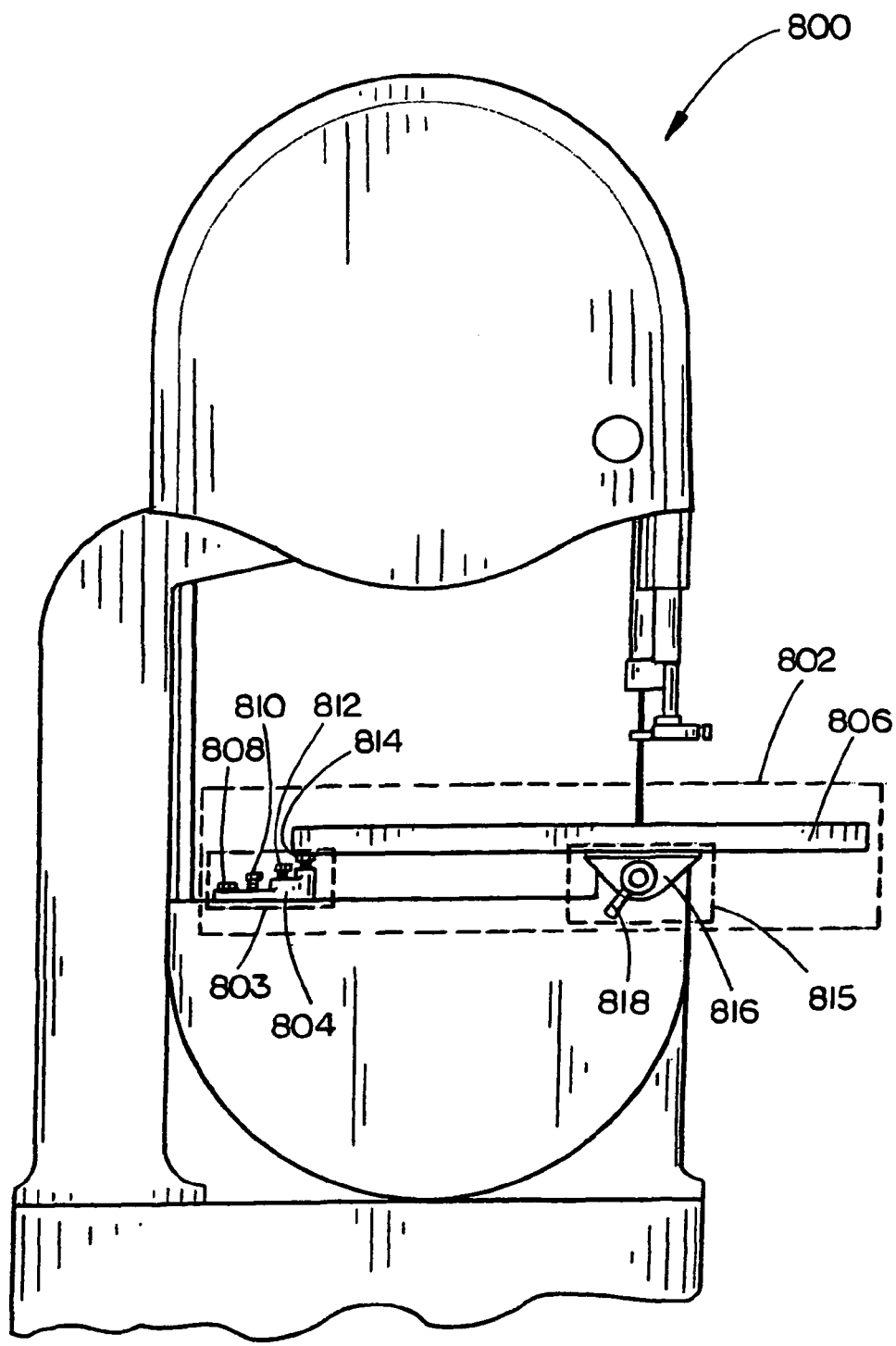
FIG. 8A is a side view of a band saw including a positive angle stop assembly employed with a variable angle table.

The method of use, shown in FIG. 7, provides a guideline for the operation of a band saw including the tensioning mechanism of the present invention. In step 702 the user determines if the handle 260 or 560 of the tensioning mechanism 200 or 500 is established in the first tensioning and biasing positions. If the handle is not established in the first tensioning and biasing positions, then in step 704 the user sets the handle into the first tensioning and biasing positions. Once the handle is established in the first tensioning and biasing positions in step 704 the user then determines if they still wish to operate the band saw in step 706. If the user does not wish to operate the band saw, then in step 710 operation of the band saw is halted. If in step 706 the user determines that they wish to proceed with operating the band saw, then in step 708 tensioning is applied through use of a standard tensioning device. Step 708 is also the next step reached by the user if in step 702 they determine that the handle is established in the first tensioning and biasing positions. After applying tensioning through use of the standard tensioning device the user, in step 712, determines if the tensioning mechanism of the present invention is properly aligned. If the user determines that the tensioning mechanism is not properly aligned, then in step 714 the user establishes the handle into a second biasing position and properly aligns the tensioning mechanism. In step 716 the user, after properly aligning the tensioning mechanism with the handle in the second biasing position, establishes the handle into the first tensioning and biasing positions.

With the tensioning mechanism properly aligned, the user may proceed to step 718 and establish the handle into a second tensioning position. Step 718 may be reached from step 712 if the tensioning mechanism is properly aligned or is reached from step 716 after the tensioning mechanism has been properly aligned. Once the handle is established in the second tensioning position the user determines if a fine adjustment of the tensioning mechanism is required. If the user determines that a fine adjustment is needed, then in step 722 the user engages the fine adjustment assembly to make the needed fine adjustments to the tensioning mechanism. After the fine adjustments are made in step 722 or if no fine adjustment is required from step 720, the user determines if band saw operation is to commence in step 724. If the user decides not to operate the band saw at this time, then they proceed back to step 704 and establish the handle in the first tensioning and biasing positions. As discussed previously, establishing the handle in the first tensioning and biasing positions releases any tensioning force being applied to a saw blade of the band saw by the tensioning mechanism. By releasing the tension on the saw blade through use of the present invention, the band saw including the saw blade may be protected from warping and damage. If in step 724 the user decides to operate the band saw with the tension settings established through use of the tension mechanism of the present invention, then the user proceeds to step 726 where operation of the band saw commences.

It is understood that the specific order or hierarchy of steps in the method disclosed is an example of an exemplary approach. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

Figure 11:
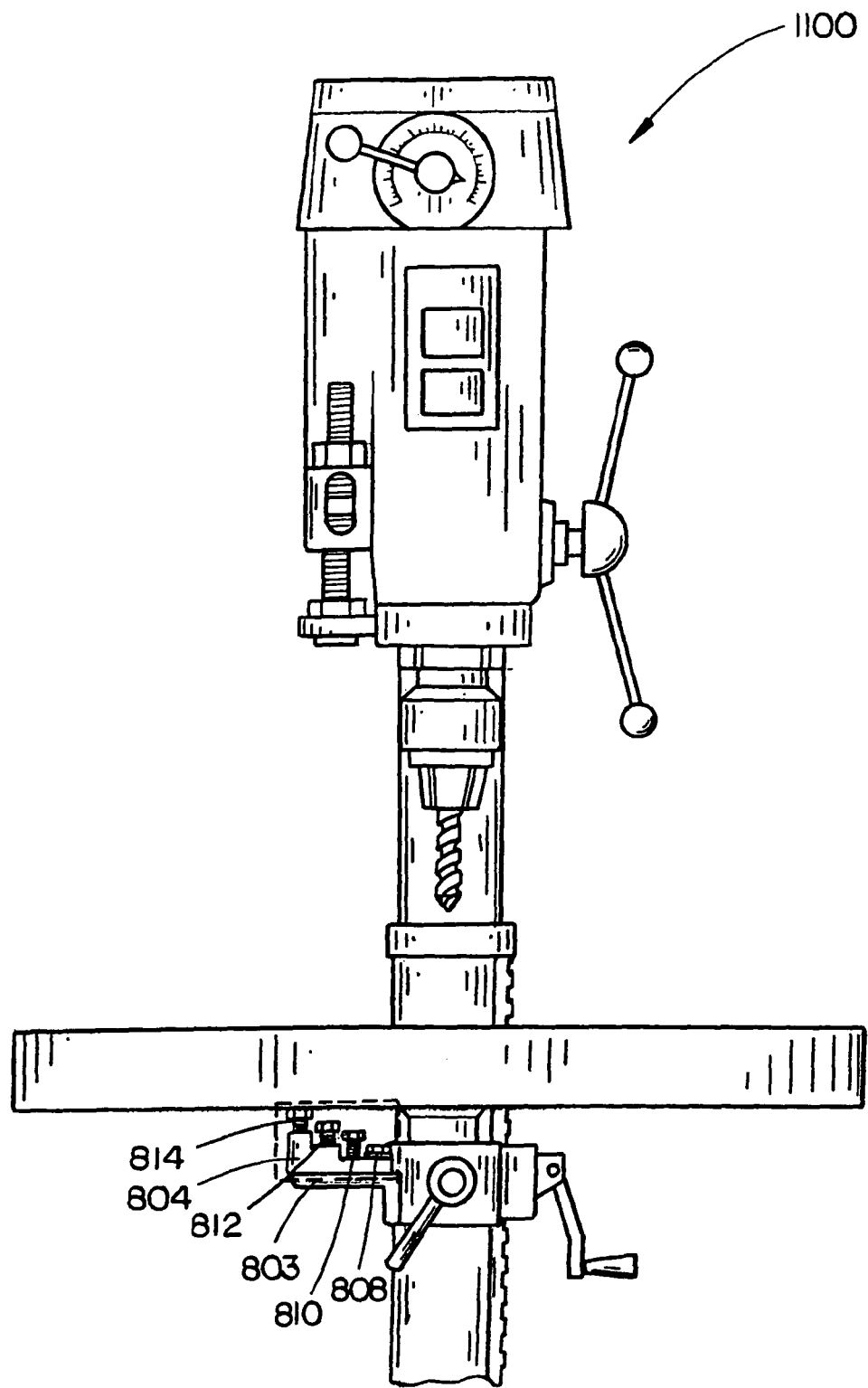
FIG. 11 is a front view of a drill press employing a positive angle stop.
Figure 12:
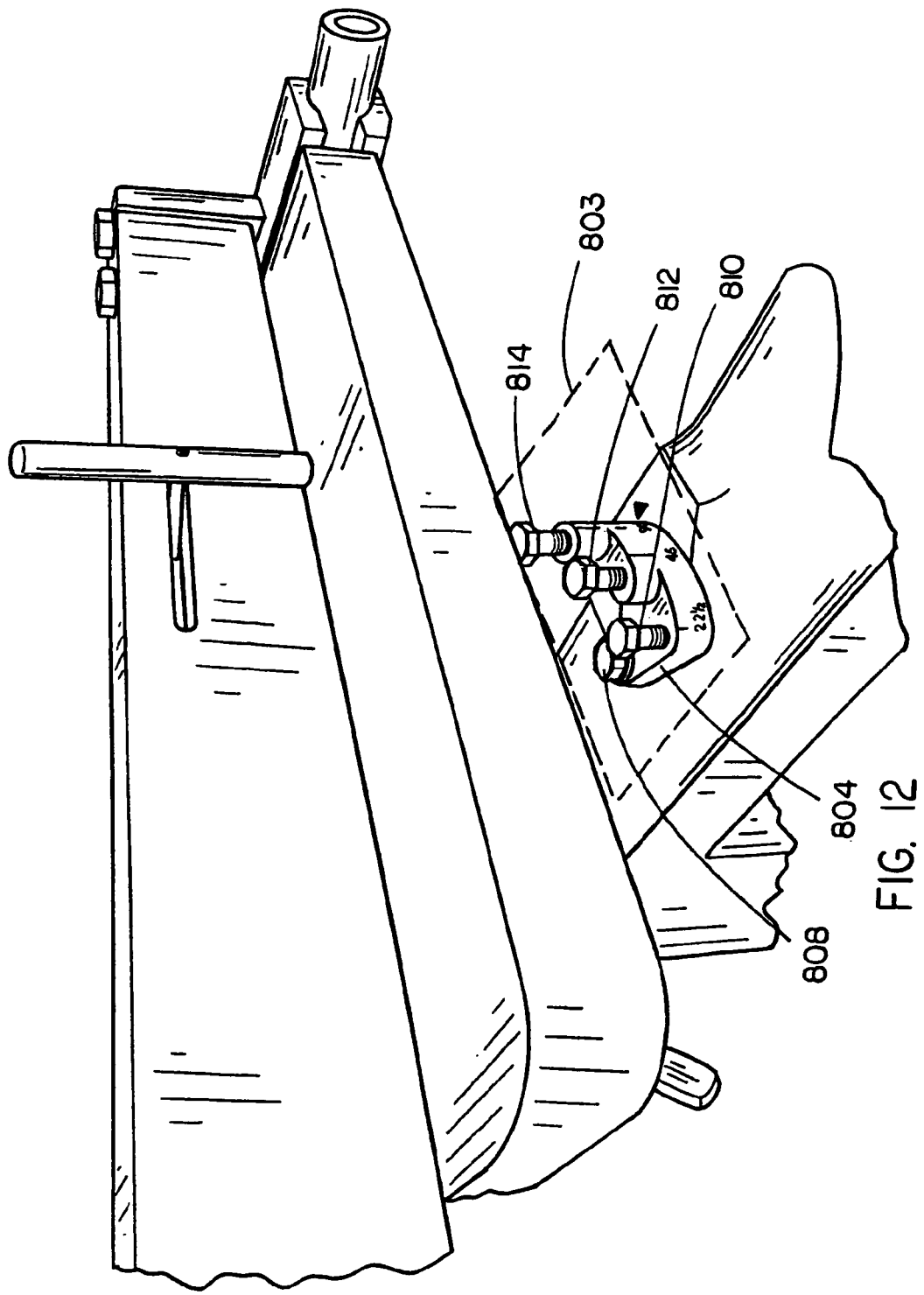
FIG. 12 is a perspective view of a positive angle stop wherein an individual stop is contacting a support surface for a belt sander.

Referring generally now to FIGS. 8A through 10, a second exemplary band saw 800, similar in every respect to the band saw 100 or 400 except band saw 800 does not include the tensioning mechanism 200 or 500 but includes the positive angle stop assembly 802, is disclosed. It is understood that the tensioning mechanism 200 or 500, described in FIGS. 1 through 7, may be employed with the positive angle stop assembly 802 on band saw 800. The positive angle stop assembly 802 includes a stop apparatus 803 which is mounted adjacent to a variable angle table 806. It is contemplated that the stop apparatus 803 may be utilized in conjunction with a variable angle table included on various tools, such as a drill press 1100 of FIG. 11, a spindle sander 1200 of FIG. 12, and the like. The stop apparatus 803 includes a turret 804. The turret 804 includes at least two positive stop devices and in the current embodiment includes a first positive stop device 810, a second positive stop device 812, and a third positive stop device 814. A fastener assembly 808, such as a bolt and lock washer, couples with the turret 804 to secure the stop apparatus 803 with the band saw 800. The positive stop devices enable the positive angular alignment of the variable angle table 806. The turret 804 may be mounted to the variable angle table 806 or the frame of the band saw 800, for pivotally selecting between the individual positive angular stops. As shown in FIGS. 11 and 12 the turret 804 may be mounted in various positions upon various tools.

The mounting of the turret 804 to the frame of the band saw 800 or the variable angle table 806 enables pivotal movement of the turret 804. In the current embodiment, the turret 804 is mounted to the frame of the band saw 800. To enable the pivotal adjustability of the turret 804, the fastener assembly 808 is employed. It is contemplated that alternative fastening assemblies, such as a pin which inserts into a receiver disposed on the frame, thereby enabling rotation of the turret 804 relative to the frame may be employed. FIG. 8B discloses an indicator 820 disposed on the frame of the band saw 800. The indicator may provide a visual identifier to the user of the present invention as to which of the individual stops the variable angle table 806 will be engaging against. It is contemplated that the turret 804 may include a pivotal stop system which enables the turret 804 to at least temporarily be stopped at certain pivotal positions. The pivotal stops correspond with the positioning of the individual stop devices in alignment with the indicator 820. Alternative rotational systems and pivotal stop systems may be employed as contemplated by those of ordinary skill in the art without departing from the scope and spirit of the present invention.

Additionally, the positive angle stop assembly 802 includes a table securing assembly 815. The table securing assembly 815 includes a mounting 816 which may be connected with the frame of the band saw in a position to enable its proper engagement with the variable angle table 806. Alternatively, the mounting 816 may be connected directly with the variable angle table 806 and be mounted and removed from the frame of the band saw 800. The mounting 816 includes a fastener 818 which allows the user to reposition the variable angle table 806 to match the angular adjustment established by the stop apparatus 803. Once the position of the variable angle table 806 is established the fastener 818 may securely affix the position of the table 806. It is understood that the devices employed to accomplish the functionality of the table securing assembly 815 described above may vary.

It is contemplated that the individual positive stop devices 810 through 814 may be enabled using various devices. In a preferred embodiment, the individual stops are hex head bolts which are received in threaded apertures included in the turret 804. Thus, the individual positive stop devices 810 through 814 may be adjustable. This adjustability enables the stops to be aligned according to the user's desire. In the current embodiment, the user may adjust the angle of the table from three degrees forward tilt to eight degrees back tilt. From a horizontal position, which may be the ninety degree (90°) position, the user may tilt the variable angle table 806 back to a ninety-eight degree (98°) position and then forward to an eighty-seven degree (87°) position. The stops may be set by screwing/unscrewing the bolts to the desired elevation. Subsequently, when a user wishes to select a preset angle, the turret 804 is pivoted to the individual stop and the variable angle table 806 is positioned. It is understood that the stop apparatus 803 may be rotated to completely remove the positive stop devices 810 through 814 from the path of engagement with the variable angle table 806. With the stop apparatus 803 out of the path of the variable angle table 806, the table 806 may reach a maximum adjustment. In the preferred embodiment, the maximum adjustment may be tilting the variable angle table back ten degrees from the horizontal ninety degree position. Thus, the variable angle table 806 may be adjusted by the user to a one hundred degree (100°) back tilt orientation. Alternative angular orientations may be enabled by the present invention, such as presenting the variable angle table 806 at forty-five degrees (45°), twenty-two and a half degrees (22.5°), and the like.

Referring generally now to FIGS. 13 through 16, a cabinet dust collection system 1302 for a band saw 1300, is disclosed. It is understood that the band saw 1300 is similar in every respect to the band saws 100, 400, and 800 described previously, except that the band saw 1300 may or may not include the tensioning mechanism 200 or 500 or the positive angle stop assembly 802. In the current embodiment, band saw 1300 is shown including the positive angle stop assembly 802.

The cabinet dust collection system 1302 includes a cabinet 1320 and the cabinet 1320 further includes a door 1322. A dust collection access point 1324 is disposed on a top side 1321 of the cabinet 1320. The dust collection access point 1324, in the preferred embodiment, is an aperture through the top side 1321 of the cabinet 1320 which is engaged by a first end 1331 of an angled chute 1330. The first end 1331 may be variously configured to engage with the dust collection access point 1324. In the current embodiment, the first end 1331 includes a first tab 1340 and a second tab 1342 which engage against the top side 1321 of the cabinet 1320. It is contemplated that the angled chute 1330 may be integrated with the cabinet 1320 or enabled to be removed from the cabinet 1320.

The angled chute 1330 is angled to receive the dust/debris "breaking off" from a saw blade 1314, as the blade 1314 begins to arc about a lower band wheel 1310. The angle of the chute 1330 is generally configured to match the path the dust/debris follows under the centrical force imposed on the dust/debris as the saw blade 1314 is driven around the lower band wheel 1310. For instance, as the blade 1314 pulls through the throat plate 1318, of the table 1316 towards the lower band wheel 1310, dust/debris caught on the blade 1314 breaks free from the blade 1314 as the blade 1314 begins to arc, thus the freed dust/debris may be influenced by centrical force as the dust/debris is thrown free.

Figure 13:
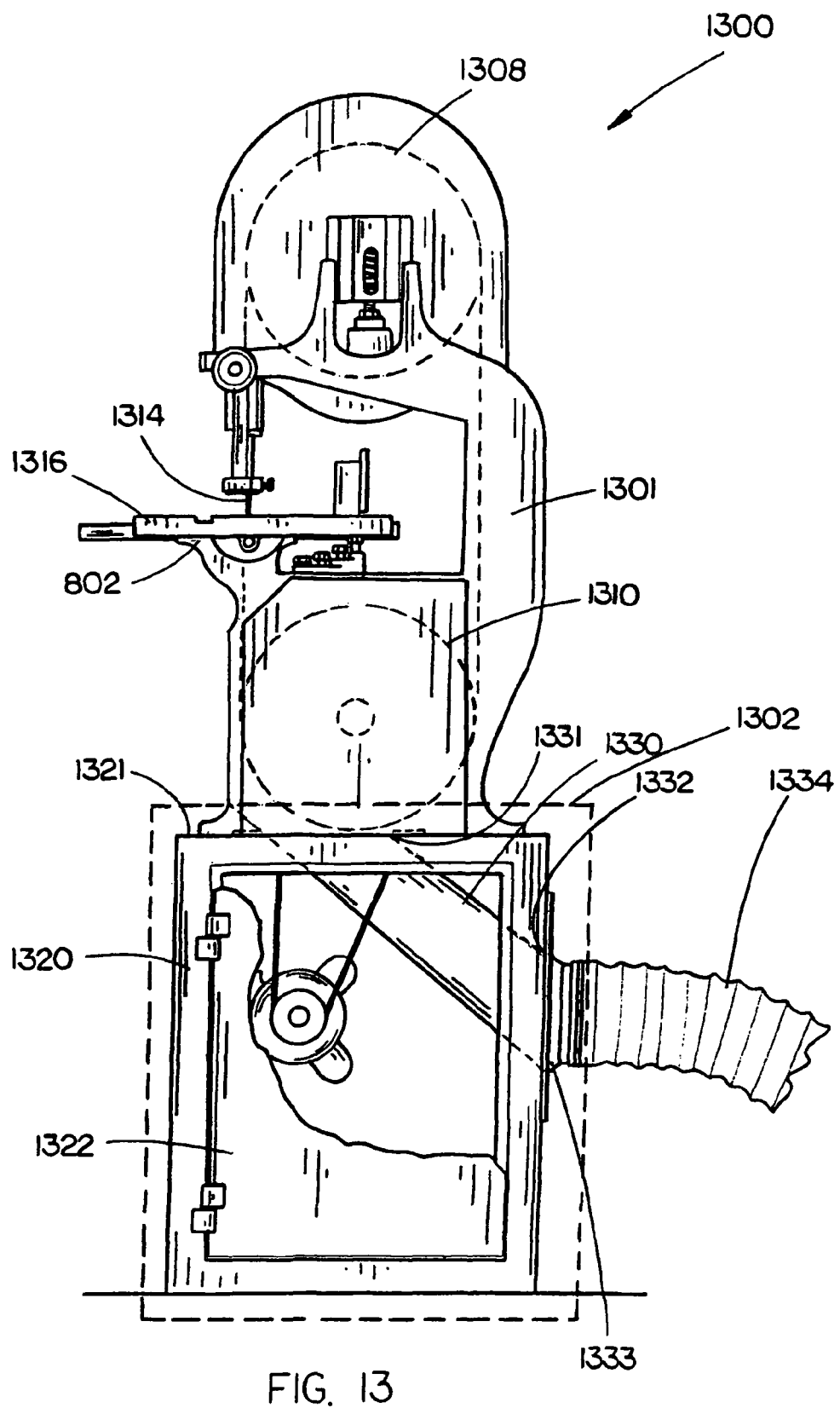
FIG. 13 is a side cut-away view of a band saw including a cabinet dust collection system connected to a vacuum hose.
Figure 14:
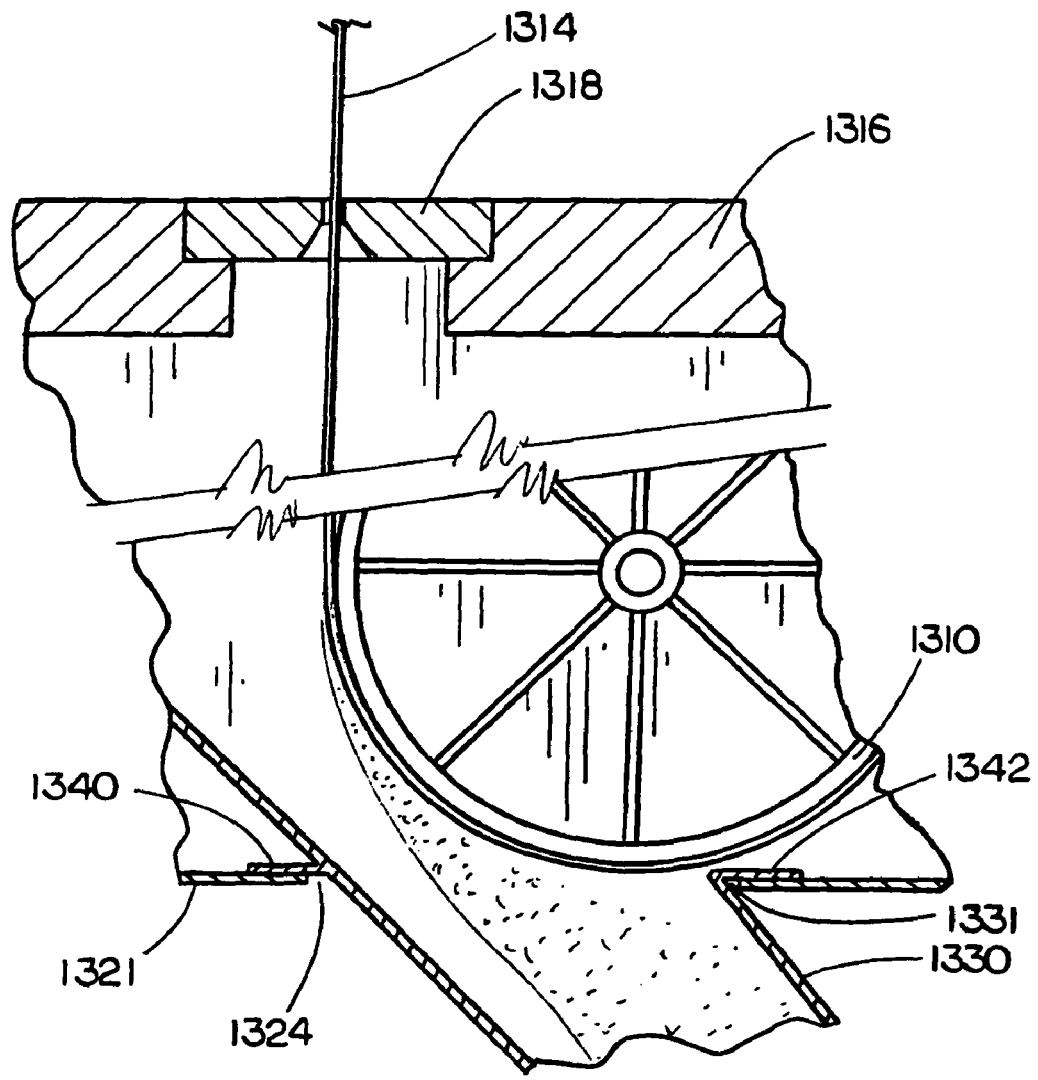
FIG. 14 is a side cut-away view of the band saw cabinet dust collection system including an angled chute for removing dust/debris.
Figure 16:
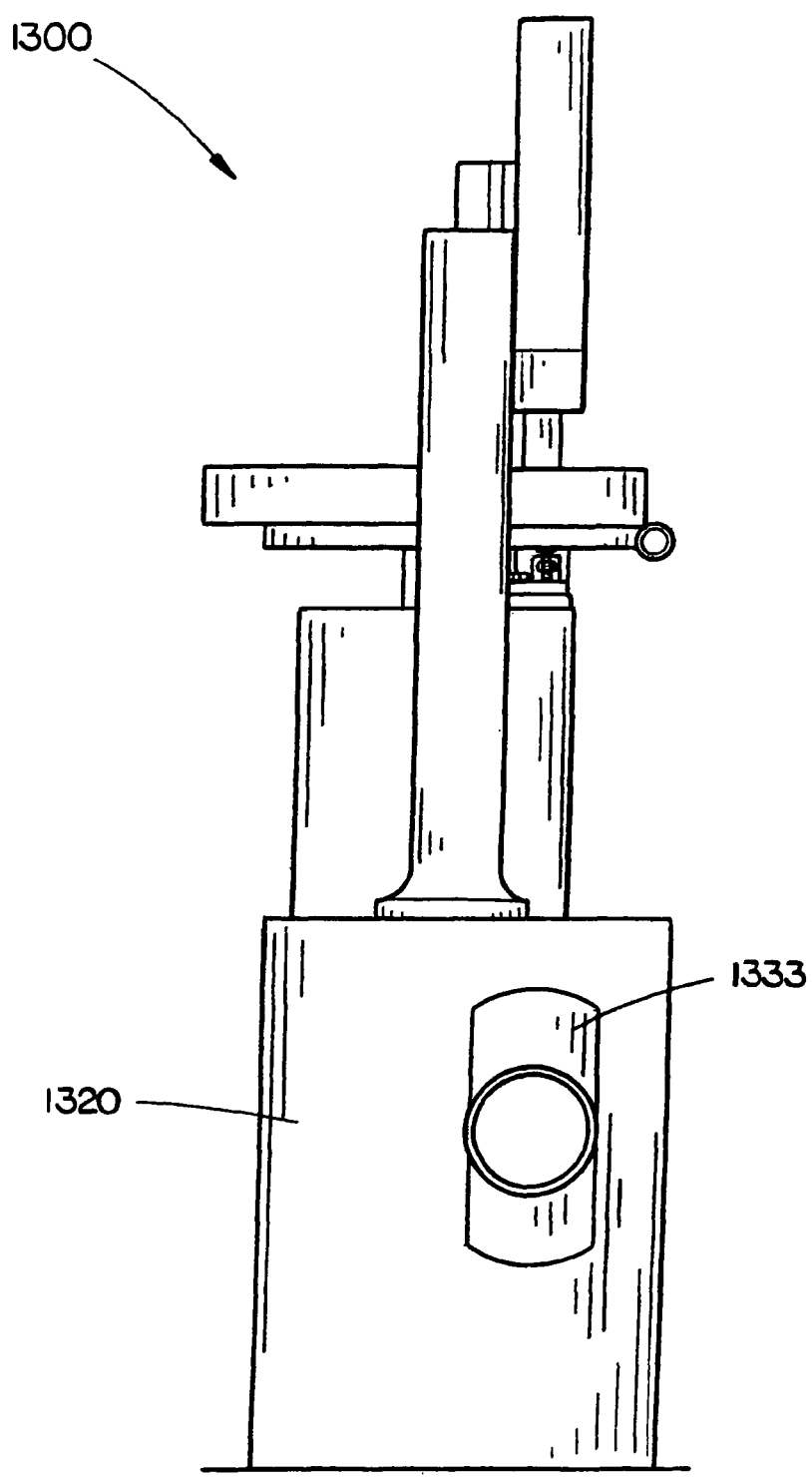
FIG. 16 is a back view of the band saw including the cabinet dust collection system having a dust collection adapter disposed within a cabinet.

The dust/debris may travel down the angled chute 1330 towards a second end 1332. The second end 1332 couples with a dust collection adapter 1333 which is disposed in a side of the cabinet 1320. As shown in FIGS. 13 and 16, the dust collection adapter 1333 enables the operational coupling of the angled chute 1330 with a vacuum hose 1334. The vacuum hose 1334 delivers the suction power to the cabinet dust collection system 1302. Suction power may be provided by various devices as contemplated by those of ordinary skill in the art. The suction power source may be proximally or remotely located relative to the band saw. The suction power source, when coupled via the vacuum hose 1334 to the cabinet dust collection system 1302, may effectively remove dust/debris from the angled cute 1330 as it falls down into the angled chute 1330.

Figure 15A:
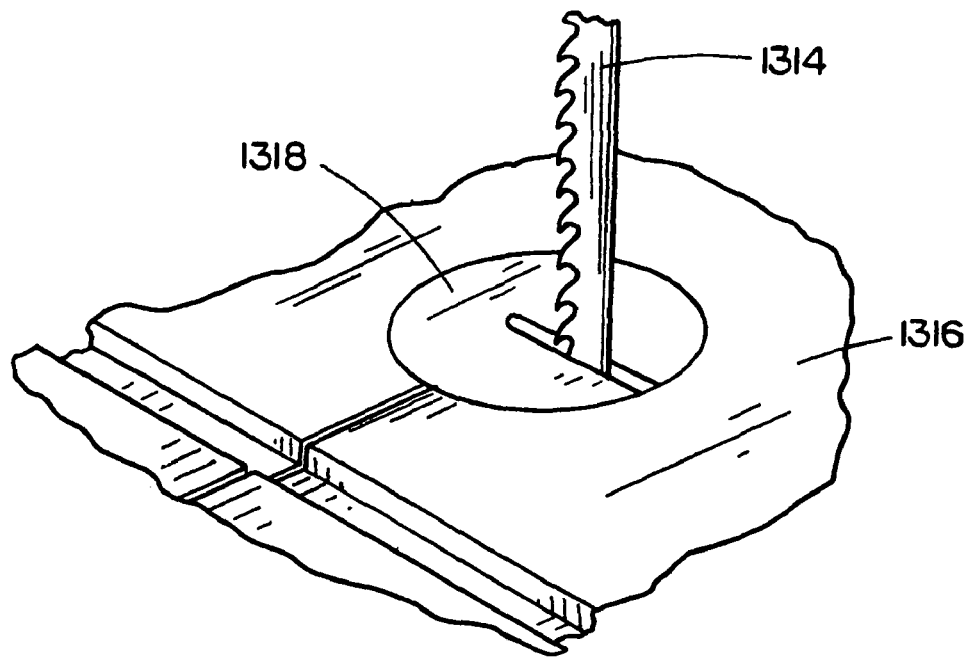
FIG. 15A is a perspective view of a saw blade extending through a throat plate disposed in an aperture of a table of a band saw.
Figure 15B:
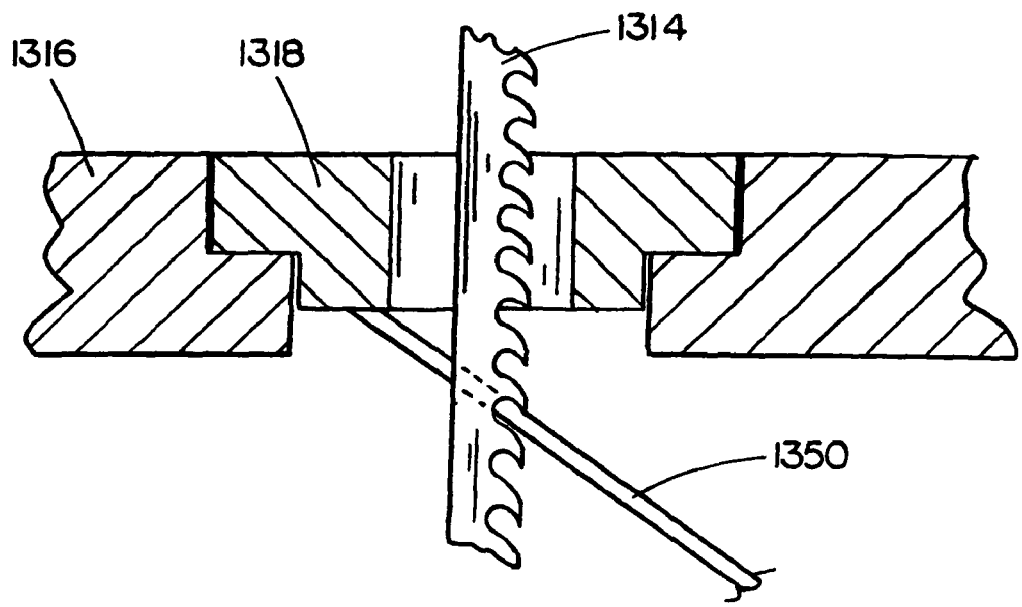
FIG. 15B is a cut-away illustration of the throat plate with an angled sub-plate for directing dust/debris.

In further embodiments, the throat plate 1318 may include an angled sub-plate 1350, as shown in FIG. 15B. The angled sub-plate 1350 may direct dust/debris towards the angled chute 1330 of the cabinet dust collection system 1302. It is contemplated that the throat plate 1318 including the angled sub-plate 1350 may be used with various tools, such as a scroll saw, a band saw, and the like, where a saw blade extends through a support surface. It is further contemplated that the throat plate 1318 including the angled sub-plate 1350 may be used with various dust collection systems without departing from the scope and spirit of the present invention.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A tensioning mechanism, comprising:
a tension spring assembly for applying a tensioning force;
a cam assembly, the cam assembly applying a force to the tension spring assembly;
a cover assembly adjustably coupled with the cam assembly, the cover assembly including a handle for enabling a user to selectively engage the cover assembly with the cam assembly in an index position, the handle having a first tensioning position and a second tensioning position for translating the user selected tensioning force to the tension spring assembly through the cam assembly; and
an index indicator coupled with the cover assembly, the index indicator for indicating the index position for the cover assembly to enable the translation of the desired tensioning force,
wherein the index indicator enables the quick selection by the user of the amount of tensioning force to be applied.

2. The tensioning mechanism of claim 1, wherein the tensioning mechanism is incorporated in a band saw.

3. The tensioning mechanism of claim 1, wherein the tension spring assembly further comprises:
a tension spring for applying the tensioning force;
a fine adjustment assembly coupled with the tension spring, the fine adjustment assembly for enabling a fine adjustment of the tension spring; and
a plunger coupled with the fine adjustment assembly, the plunger for translating the force from the cam assembly to the tension spring.

4. The tensioning mechanism of claim 1, wherein the cam assembly further comprises:
a cam including a cam actuation member and a pin, the cam for coupling with the tension spring assembly; and
a cam actuator coupled with the cam actuation member, wherein the cam assembly applies a force to the tension spring assembly.

5. The tensioning mechanism of claim 4, wherein the pin couples with the tension spring assembly.

6. The tensioning mechanism of claim 1, wherein the cover assembly further comprises:
a cover coupled with the handle, the cover enabled to selectively engage with the cam assembly;
a biasing assembly coupled with the cover, the biasing assembly enabling the selective engagement of the cover with the cam assembly; and
an index indicator coupled with the cover, the index indicator establishing a visual marker for user identification of the index position of the cover.

7. The tensioning mechanism of claim 6, wherein the biasing assembly includes a biasing member coupled with a spring, wherein the biasing assembly enables the handle and cover into a first biasing position and second biasing position.

8. The tensioning mechanism of claim 6, wherein the visual marker is selected from the group consisting of a line, an arrowed line, a symbol, a logo, a numeric representation, and a textual representation, for identifying the index position.

9. The tensioning mechanism of claim 6, wherein the handle may be established in a plurality of positions.

10. The tensioning mechanism of claim 6, wherein the handle is removable from the cover.

11. The tensioning mechanism of claim 1, further comprising a securing assembly.

12. A band saw including a frame coupled with an upper band wheel which operationally engages a band saw blade, comprising:
a tension spring assembly operationally engaged with an upper arm of the frame, the tension spring assembly applying a tensioning force to the upper band wheel;
a cam assembly operationally engaging with the tension spring assembly, the cam assembly applying a force to the tension spring assembly; and
a cover assembly adjustably coupled with the cam assembly, the cover assembly including a handle for enabling a user to selectively engage the cover assembly with the cam assembly in an index position, the handle having a first tensioning position and a second tensioning position for translating the user selected tensioning force to the tension spring assembly through the cam assembly; and
an index indicator coupled with the cover assembly, the index indicator for indicating the index position for the cover assembly to enable the translation of the desired tensioning force,
wherein the index indicator enables the quick selection by the user of the amount of tensioning force to be applied to the band saw blade.

13. The band saw of claim 12, wherein the tension spring assembly further comprises:
a tension spring for applying the tensioning force;
a fine adjustment assembly coupled with the tension spring, the fine adjustment assembly for enabling a fine adjustment of the tension spring; and
a plunger coupled with the fine adjustment assembly, the plunger for translating the force from the cam assembly to the tension spring.

14. The band saw of claim 12 wherein the cam assembly further comprises:
a cam including a cam actuation member and a pin, the cam for coupling with the tension spring assembly; and a cam actuator coupled with the cam actuation member, wherein the cam assembly applies a force to the tension spring assembly.

15. The band saw of claim 14, wherein the pin couples with the tension spring assembly.

16. The band saw of claim 14, wherein the pin is removable from the cam.

17. The band saw of claim 12, wherein the cover assembly further comprises:
a cover coupled with the handle, the cover enabled to selectively engage with the cam assembly;
a biasing assembly coupled with the cover, the biasing assembly enabling the selective engagement of the cover with the cam assembly; and
an index indicator coupled with the cover, the index indicator establishing a visual marker for user identification of the index position of the cover.

18. The band saw of claim 17, wherein the biasing assembly includes a biasing member coupled with a spring, wherein the biasing assembly enables the handle and cover into a first biasing position and second biasing position.

19. The band saw of claim 17, wherein the visual marker is selected from the group consisting of a line, an arrowed line, a symbol, a logo, a numeric representation, and a textual representation, for identifying the index position.

20. The band saw of claim 17, wherein the handle is removable from the cover.

21. The band saw of claim 17, wherein the handle may be established in a plurality of positions.

22. The band saw of claim 12, further comprising a securing assembly.

23. The tensioning mechanism of claim 12, wherein the band saw further comprises a cabinet dust collection system.

24. The tensioning mechanism of claim 12, wherein the band saw further comprises a positive angle stop assembly.

25. The band saw of claim 12, wherein the band saw further includes a standard blade tensioning device.

26. A band saw having a frame coupled with a lower band wheel, the lower band wheel operationally engaged by a motor, an upper band wheel, the upper band wheel vertically aligned with the lower band wheel and operationally engaging a band saw blade, and an upper arm including a sliding tension bracket, the sliding tension bracket coupled with the upper band wheel, comprising:
   a recessed area defined within the sliding tension bracket;
   a tension spring assembly having a tension spring disposed within the recessed area, the tension spring for applying a tensioning force which is translated through the sliding tension bracket to the upper band wheel;
   a cam assembly operationally engaging with the tension spring assembly, the cam assembly applying a force to the tension spring; and
   a cover assembly adjustably coupled with the cam assembly, the cover assembly including a handle for enabling a user to selectively engage the cover assembly with the cam assembly in an index position, the handle having a first tensioning position and a second tensioning position for translating the user selected tensioning force to the tension spring assembly through the cam assembly; and
   an index indicator coupled with the cover assembly, the index indicator for indicating the index position for the cover assembly to enable the translation of the desired tensioning force,
   wherein the index indicator enables the quick selection by the user of the amount of tensioning force to be applied to the band saw blade based on the size of the band saw blade.

27. The band saw of claim 26, wherein the tension spring assembly further comprises:
   a fine adjustment assembly coupled with the tension spring, the fine adjustment assembly for enabling a fine adjustment of the tension spring; and a plunger coupled with the fine adjustment assembly, the plunger for translating the force from the cam assembly to the tension spring.

28. The band saw of claim 26, wherein the cam assembly further comprises:
   a cam including a cam actuation member and a pin, the cam for coupling with the tension spring assembly; and
   a cam actuator coupled with the cam actuation member, wherein the cam assembly applies a force to the tension spring assembly.

29. The band saw of claim 28, wherein the pin couples with the tension spring assembly.

30. The band saw of claim 28, wherein the pin is removable from the cam.

31. The band saw of claim 26, wherein the cover assembly further comprises:
   a cover coupled with the handle, the cover enabled to selectively engage with the cam assembly;
   a biasing assembly coupled with the cover, the biasing assembly enabling the selective engagement of the cover with the cam assembly; and
   an index indicator coupled with the cover, the index indicator establishing a visual marker for user identification of the index position of the cover.

32. The band saw of claim 31, wherein the biasing assembly includes a biasing member coupled with a spring, wherein the biasing assembly enables the handle and cover into a first biasing position and second biasing position.

33. The band saw of claim 31, wherein visual marker is selected from the group consisting of a line, an arrowed line, a symbol, a logo, a numeric representation, and a textual representation, for identifying the index position.

34. The band saw of claim 31, wherein the handle is removable from the cover.

35. The band saw of claim 31, wherein the handle may be established in a plurality of positions.

36. The band saw of claim 26, further comprising a securing assembly.

37. The band saw of claim 26, further comprising a cabinet dust collection system.

38. The band saw of claim 26, further comprising a positive angle stop assembly.

39. The band saw of claim 26, further includes a standard blade tensioning device.

* * * * *